United States Patent
Shimizu

(10) Patent No.: US 9,635,620 B2
(45) Date of Patent: Apr. 25, 2017

(54) WIRELESS COMMUNICATION DEVICE AND CONTROLLED METHOD TO TRANSMIT A PLURALITY OF SIGNALS IN PARALLEL

(71) Applicant: FUJITSU LIMITED, Kawasaki-shi, Kanagawa (JP)

(72) Inventor: Masatsugu Shimizu, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/810,016

(22) Filed: Jul. 27, 2015

(65) Prior Publication Data

US 2016/0044604 A1 Feb. 11, 2016

(30) Foreign Application Priority Data

Aug. 6, 2014 (JP) .................................. 2014-160857

(51) Int. Cl.
*H04W 52/34* (2009.01)
*H04W 52/24* (2009.01)
(Continued)

(52) U.S. Cl.
CPC ........... *H04W 52/26* (2013.01); *H04W 52/34* (2013.01); *H04W 52/367* (2013.01)

(58) Field of Classification Search
CPC ... H04W 52/26; H04W 52/367; H04W 52/00; H04W 52/04; H04W 52/06; H04W 52/08;
(Continued)

(56) References Cited

U.S. PATENT DOCUMENTS

2009/0202017 A1   8/2009   Ichihara
2011/0320098 A1  12/2011  Ito et al.
2013/0100880 A1*  4/2013  Moren ................ H04W 52/367
                                                              370/328

FOREIGN PATENT DOCUMENTS

WO    WO 2007/132916 A1    11/2007
WO    WO 2010/109548 A1     9/2010

OTHER PUBLICATIONS

"3rd Generation Partnership Project; Technical Specification Group Radio Access Network; User Equipment (UE) radio transmission and reception (FDD)(Release 12)", 3GPP TS 25.101 (V12.4.0 (Jun. 2014) Technical Specification, 3rd Generation Partnership Project, 2014.

* cited by examiner

Primary Examiner — Philip Sobutka
(74) Attorney, Agent, or Firm — Arent Fox LLP

(57) ABSTRACT

A wireless communication apparatus including: at least one antenna configured to transmit a transmission signal including radio signals in parallel, each radio signal having each frequency band, the radio signals including physical channels, each radio signal including at least one of the physical channels, a memory configured to store coefficient values, each coefficient value being associated with each first factor and each second factor, each first factor being each identity among each set of scrambling codes used in each set of specific physical channels among the physical channels, each second factor being each set of transmission formats used in each set of specific physical channels among the physical channels, and a processor configured to: obtain, for each repeated combination taken from the physical channels, each of coefficient values from the stored coefficient values, and estimate an exponential of amplitude of the transmission signal based on the obtained coefficient values.

10 Claims, 13 Drawing Sheets

(51) Int. Cl.
*H04W 52/26* (2009.01)
*H04W 52/36* (2009.01)

(58) Field of Classification Search
CPC ..... H04W 52/10; H04W 52/12; H04W 52/14; H04W 52/18; H04W 52/22; H04W 52/221; H04W 52/223; H04W 52/225; H04W 52/226; H04W 52/228; H04W 52/24; H04W 52/241; H04W 52/245; H04W 52/246; H04W 52/247; H04W 52/30; H04W 52/322; H04W 52/325; H04W 52/327; H04W 52/34; H04W 52/343; H04W 52/346; H04W 52/36; H04W 52/362; H04W 52/365
USPC .......................................................... 455/522
See application file for complete search history.

FIG. 5

| Case No | THE NUMBER OF E-DPDCH CODES | E-DPDCH SF | MODULATION SYSTEM |
|---|---|---|---|
| 1 | 1 | 16 | BPSK |
| 2 | 1 | 8 | BPSK |
| 3 | 1 | 4 | BPSK |
| 4 | 1 | 2 | BPSK |
| 5 | 2 | 2 | BPSK |
| 6 | 4 | 2 | 4PAM |
| --- | | | |

FIG. 7

| COEFFICIENT TERM | Case No (DC-HSUPA) | | |
|---|---|---|---|
| | DC_1 | DC_2 | DC_3 |
| 701-1  $k(c\#1,c\#1,c\#1)$ | 14 | 14 | 14 |
| 701-2  $k(ed\#1,ed\#1,c\#1)$ | 42 | 120 | 120 |
| 701-3  $k(c\#1,ed\#2,c\#2)$ | 42 | 370 | 400 |
| 701-4  $k(c\#2,c\#2,c\#2)$ | 14 | 110 | 200 |
| --- | | | |

400a / 400b

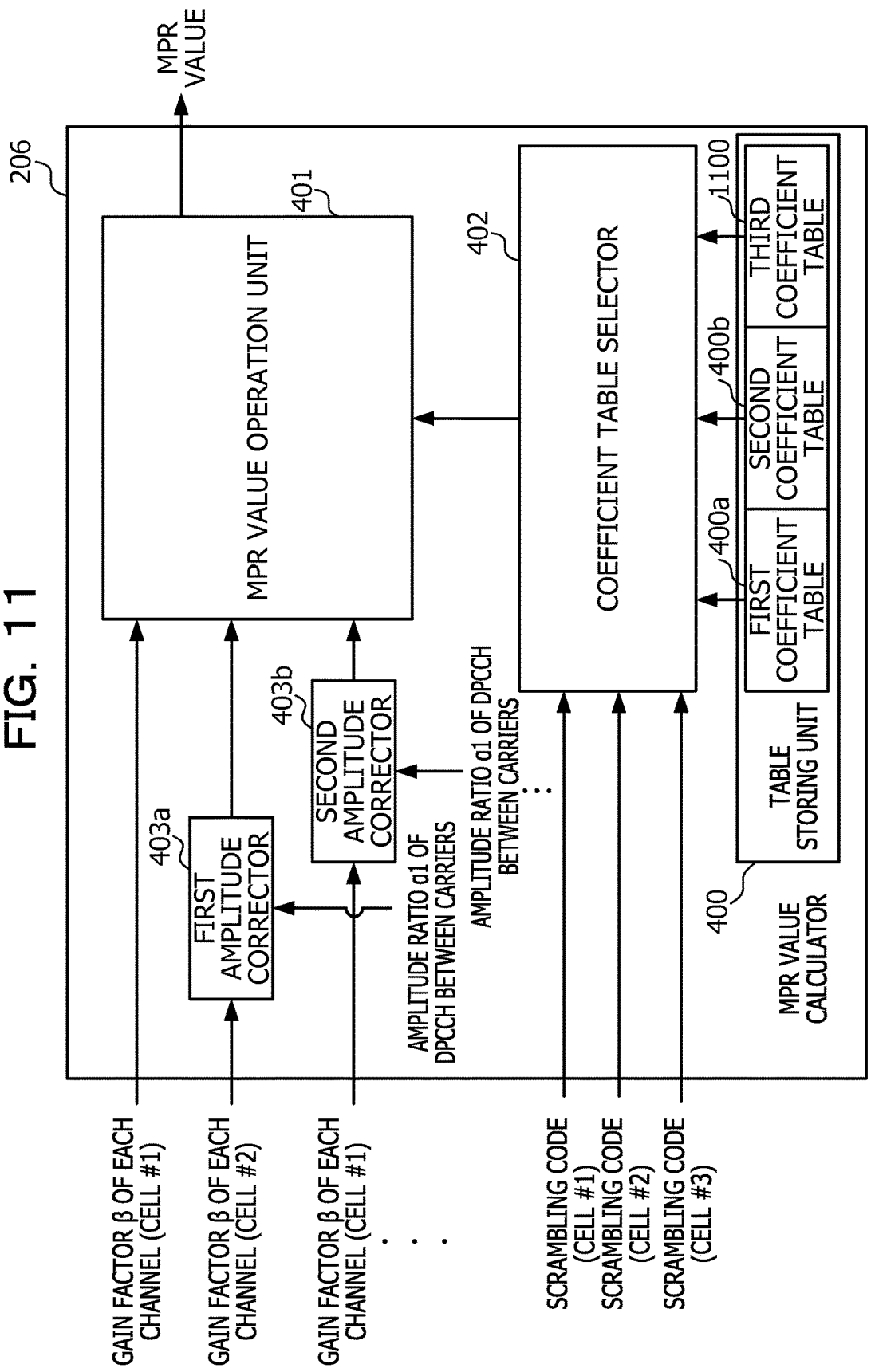

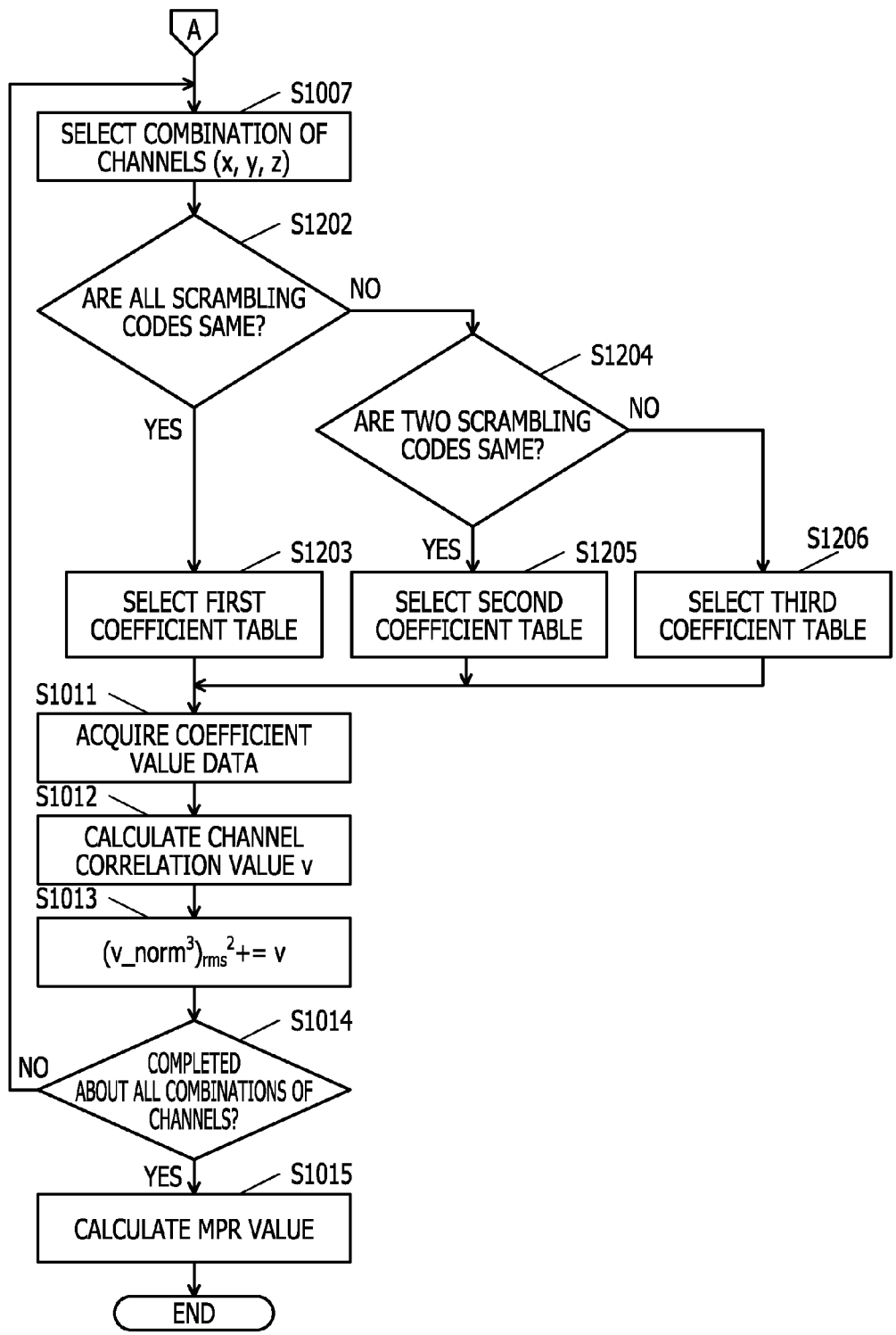

WIRELESS COMMUNICATION DEVICE AND CONTROLLED METHOD TO TRANSMIT A PLURALITY OF SIGNALS IN PARALLEL

CROSS-REFERENCE TO RELATED APPLICATION

This application is based upon and claims the benefit of priority from the prior Japanese Patent Application No. 2014-160857 filed on Aug. 6, 2014, the entire contents of which are incorporated herein by reference.

FIELD

The embodiments discussed herein are related to a wireless communication device and a controlling method.

BACKGROUND

As a related art, in the 3rd generation partnership project (3GPP), the high speed uplink packet access (HSUPA) system is standardized. In the HSUPA, maximum power reduction (MPR) to reduce the maximum transmission power is carried out. The MPR is carried out by reducing the maximum transmission power according to a reduction allowable value calculated on the basis of a value that is called cubic metric (CM) and is obtained from a transmission waveform for example (refer to e.g. "3rd Generation Partnership Project; Technical Specification Group Radio Access Network; User Equipment (UE) radio transmission and reception (FDD) (Release 11)," 3GPP TS 25.101 V11.9.2, April 2014).

Furthermore, in the HSUPA, there is a method in which the CM value is calculated by using a baseband signal to be transmitted (refer to e.g. International Publication Pamphlet No. WO 2007/132916 (hereinafter, Patent Document 1)). Moreover, in single cell (SC)-HSUPA, there is a method in which, for calculate of the CM value, the time average of an exponential of the amplitude of a transmission signal is calculated by performing a product-sum operation of a transmission-power-dependent term including a modulation parameter that depends on the transmission power of the transmission signal and a time average term including only a modulation parameter that does not depend on the transmission power of the transmission signal (refer to e.g. International Publication Pamphlet No. WO 2010/109548 (hereinafter, Patent Document 2)).

Furthermore, in the 3GPP, the dual cell (DC)-HSUPA system, in which the respective signals generated by two carriers are simultaneously transmitted, is also standardized.

SUMMARY

According to an aspect of the embodiment, a wireless communication apparatus includes at least one antenna configured to transmit a transmission signal including a plurality of radio signals in parallel, each of the plurality of radio signals having each of a plurality of frequency bands, the plurality of radio signals including a plurality of physical channels, each of the plurality of radio signals including at least one of the plurality of physical channels, a memory configured to store a plurality of coefficient values, each of the plurality of coefficient values being associated with each of a plurality of first factors and each of a plurality of second factors, each of the plurality of first factors being each of a plurality of identities among each set of scrambling codes used in each set of specific physical channels among the plurality of physical channels, each of the plurality of second factors being each set of transmission formats used in each set of specific physical channels among the plurality of physical channels, and a processor configured to: obtain, for each repeated combination taken from the plurality of physical channels, each of coefficient values from the stored plurality of coefficient values, and estimate an exponential of amplitude of the transmission signal based on the obtained coefficient values.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating one example of a transmission format of each cell;

FIG. 7 is a diagram illustrating one example of respective coefficient tables;

FIG. 11 is a diagram illustrating one example of a configuration of an MPR value calculator according to embodiment 2;

FIG. 12B is a (second) flowchart illustrating one example of calculation processing of an MPR value in a terminal device according to embodiment 2.

DESCRIPTION OF EMBODIMENTS

However, in the related art, there is a problem that the amount of operation for calculation of the reduction allowable value of the maximum transmission power is large in the case of simultaneously transmitting the respective signals generated by plural carriers.

In one aspect, the embodiments discussed herein are intended to reduce the amount of operation for calculation of the reduction allowable value of the maximum transmission power in the case of simultaneously transmitting the respective signals generated by plural carriers.

Preferred embodiments 1 and 2 of disclosed techniques will be described in detail below with reference to the drawings.

Embodiment 1

One Example of Configuration of Communication Device According to Embodiment 1

Figure 1:
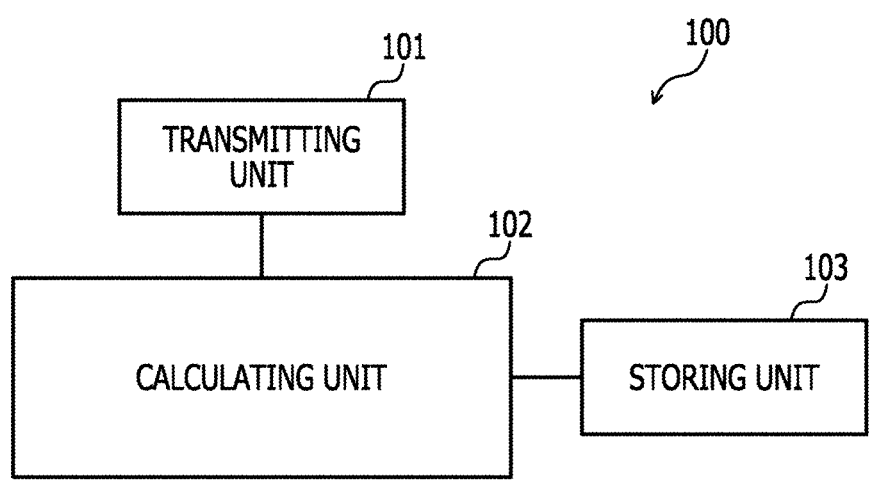
FIG. 1 is a diagram illustrating one example of a configuration of a communication device according to embodiment 1.

FIG. 1 is a diagram illustrating one example of a configuration of a communication device according to embodiment 1. A communication device 100 includes a transmitting unit 101, a calculating unit 102, and a storing unit 103. The transmitting unit 101 generates signals obtained by multiplexing plural physical channels about plural carriers and simultaneously transmits the respective signals generated about the plural carriers.

The plural physical channels are e.g. the respective transmission paths multiplexed on the basis of a spreading code and the time. The plural carriers are e.g. frequencies with which plural carrier waves different in the frequency band are transmitted. As one example, the plural carriers correspond to two transmission frequencies in dual cell-high speed uplink packet access (DC-HSUPA).

First, the transmitting unit 101 generates a signal obtained by multiplexing the plural physical channels on each carrier basis. Then, the transmitting unit 101 simultaneously (namely, in parallel) transmits the signals obtained by multiplexing the plural physical channels. For example, the transmitting unit 101 transmits the signals in such a manner that at least part of each of the signals generated on each carrier basis overlaps among the carriers in terms of time. Furthermore, the transmitting unit 101 transmits the respective signals generated about the plural carriers by transmission power controlled on the basis of a reduction allowable value calculated by the calculating unit 102 for example. The reduction allowable value is e.g. a maximum power reduction (MPR) value to be described later.

The control of the transmission power in the transmitting unit 101 is carried out by reducing the maximum transmission power of a signal to be transmitted according to the reduction allowable value calculated by the calculating unit 102 for example. For example, the control of the transmission power in the transmitting unit 101 is carried out by reducing the maximum transmission power of a signal to be transmitted by the reduction allowable value calculated by the calculating unit 102.

The calculating unit 102 calculates the time average value of an exponential of the transmission waveform of a signal to be transmitted by the transmitting unit 101 for calculating the reduction allowable value used for the control of the transmission power in the transmitting unit 101. The transmission waveform is e.g. a waveform observed at a transmitting antenna end. The time average value of an exponential of the transmission waveform is a value for calculating a cubic metric (CM) value according to the transmission waveform and is represented by $(v\_norm^3)_{rms}$ in expression (1) to be described later for example.

Hereinafter, the time average value of the correlation among plural physical channels will be referred to as the "correlation time average value." Furthermore, the ratio of the amplitude of a reference channel between plural carriers will be referred to as the "amplitude ratio of the reference channel." Amplitude ratio information is information indicating the ratio of the amplitude between plural physical channels in a signal generated by the transmitting unit 101. Furthermore, the amplitude ratio information is information obtained on each carrier basis. For example, the amplitude ratio information is a modulation parameter for deciding the amplitude of each channel among modulation parameters used for generation of a signal by the transmitting unit 101, and is a gain factor $\beta$ to be described later as one example.

The correlation time average value is a correlation time average value obtained, with the amplitude defined as 1, in the signal generated by the transmitting unit 101. The correlation time average value is derived by using modulation parameters of plural physical channels different from the amplitude ratio information among modulation parameters used for generation of the signal by the transmitting unit 101. The modulation parameters for deriving the correlation time average value are e.g. modulation parameters that do not have an influence on the amplitude of the physical channel. For example, the modulation parameters for deriving the correlation time average value are modulation parameters excluding the gain factor $\beta$ among modulation parameters used for generation of the signal by the transmitting unit 101. Furthermore, the correlation time average value is a value according to the combination of scrambling codes that are stored and used among plural carriers.

For example, the calculating unit 102 calculates the time average value of an exponential of the transmission waveform of a signal obtained by multiplexing the respective signals by an operation based on the amplitude ratio information, the correlation time average value, and the ratio of the amplitude of the reference channel. For example, the calculating unit 102 calculates the time average value of an exponential of the transmission waveform of a signal obtained by multiplexing the respective signals by an operation based on the correlation time average value and the amplitude ratio information corrected by the ratio of the amplitude of the reference channel (namely, a correction factor). The operation by the calculating unit 102 is e.g. a product-sum operation, in which results of multiplication are sequentially added.

Furthermore, the calculating unit 102 calculates a reduction allowable value by using the calculated time average value of an exponential of the transmission waveform and outputs the calculated reduction allowable value to the transmitting unit 101. The reduction allowable value, details of which will be described later by using expression (1), is calculated on the basis of a CM value obtained from the time average value of an exponential of the transmission waveform for example.

Next, the respective pieces of information for calculating the time average value of an exponential of the transmission waveform will be described. The amplitude ratio information, the correlation time average value, and the amplitude ratio of the reference channel are calculated by using the modulation parameters used for generation of a signal in the transmitting unit 101 for example.

As one example, the modulation parameters for deriving the correlation time average value include the number of codes, the spreading factor, the modulation scheme or the channelization code or any combination thereof. In this manner, the calculating unit 102 can derive the correlation time average value that does not depend on the amplitude ratio information by using modulation parameters excluding the amplitude ratio information.

The storing unit 103 stores correlation time average values calculated in advance about combinations of plural modulation parameters for each of the combinations of the modulation parameters for example. Furthermore, the calculating unit 102 acquires the correlation time average value corresponding to the modulation parameters of plural physical channels from the correlation time average values stored in the storing unit 103. This allows the calculating unit 102 to derive the correlation time average value among intended physical channels by using the modulation parameters from the correlation time average values stored in the storing unit 103.

The amplitude ratio of the reference channel is the ratio of the amplitude of the reference channel between carriers. As one example, the amplitude ratio of the reference channel is an amplitude ratio α of dedicated physical control channel (DPCCH) to be described later between carriers.

The calculating unit 102 calculates the amplitude ratio of the reference channel on the basis of the amplitude of the reference channel of each carrier for example. The amplitude of the reference channel for calculation of the amplitude ratio of the reference channel by the calculating unit 102 is set on the basis of control information received by the communication device 100 from a communication device of the transmission destination of each signal of the communication device 100 for example. The control information received by the communication device 100 is e.g. information indicating the assignment of resources.

The above-described amplitude ratio information is the amplitude ratio of each carrier when the amplitude of the reference channel of each carrier is defined as 1 for example. Therefore, in the respective pieces of amplitude ratio information in different carriers, the amplitude as the basis differs depending on the power allocation to the respective carriers.

In contrast, the calculating unit 102 can calculate the time average value of an exponential of the transmission waveform according to the power allocation to the respective carriers by using the amplitude ratio of the reference channel. For example, the calculating unit 102 corrects the amplitude ratio information by using the amplitude ratio of the reference channel and can calculate the time average value of an exponential of the transmission waveform according to the power allocation to the respective carriers by an operation with the corrected amplitude ratio information and the correlation time average value.

However, the procedure of calculating the time average value of an exponential of the transmission waveform by using the amplitude ratio of the reference channel, the amplitude ratio information, and the correlation time average value is not limited to the procedure in which the amplitude ratio information is corrected by using the amplitude ratio of the reference channel and an operation with the corrected amplitude ratio information and the correlation time average value is performed. For example, the calculating unit 102 may calculate the time average value of an exponential of the transmission waveform by expressions of a product-sum operation including the amplitude ratio of the reference channel, the amplitude ratio information, and the correlation time average value as variables (e.g. expressions (6), (8), and (9) to be described later).

As above, the communication device 100 calculates and stores combinations of modulation parameters excluding plural pieces of amplitude ratio information in advance and thus can derive the correlation time average value for calculating the time average value of an exponential of the transmission waveform. Furthermore, the communication device 100 can calculate the time average value of an exponential of the transmission waveform according to the power allocation to the respective carriers by a product-sum operation with use of the amplitude ratio of the reference channel of each carrier in addition to the derived correlation time average value and the amplitude ratio information.

Thus, the communication device 100 can calculate, with a small amount of operation, the reduction allowable value of the maximum transmission power in the case of simultaneously transmitting the respective signals generated by plural carriers.

By calculating the reduction allowable value with a small amount of operation, the communication device 100 can calculate the reduction allowable value in a short time and improve the response speed of the reduction allowable value against variation in the transmission waveform for example. Thereby, the communication device 100 can improve the transmission properties for example. Furthermore, by calculating the reduction allowable value with a small amount of operation, the communication device 100 can reduce the power consumption for calculation of the reduction allowable value for example.

Furthermore, the storing unit 103 may store the correlation time average value about each of combinations of scrambling codes among plural carriers. The scrambling code is a spreading code used for spreading modulation on each carrier basis. The combination of scrambling codes is e.g. a state according to the number of carriers whose scrambling codes correspond with each other among plural carriers. As one example, the combination of scrambling codes can take either a correspondent or different state if the number of carriers is two.

Furthermore, if the number of carriers is three, the combination of scrambling codes can take any one combination of a combination in which all codes correspond with each other, a combination in which two codes correspond with each other and the remaining one does not correspond, and a combination in which all of the three codes are different for example. Although the case in which the number of carriers is three is described as an example here, the combination of scrambling codes can take combinations according to the number of scrambling codes corresponding with each other also when the number of carriers is four or more.

The calculating unit 102 derives the correlation time average value by using scrambling codes of plural carriers from the correlation time average values stored in the storing unit 103. Therefore, the calculating unit 102 can use the correlation time average value that changes according to the combination of scrambling codes in the calculation of the time average value of an exponential of the transmission waveform.

The above-described correlation time average value changes according to the combination of scrambling codes. Thus, the correlation time average value can be easily derived by acquiring the correlation time average value according to the combination of scrambling codes. Therefore, by deriving the correlation time average value obtained in consideration of the difference in the stored scrambling codes, the communication device 100 can calculate the reduction allowable value of the maximum transmission power in plural carriers with a small amount of operation.

The transmission system of the communication device 100 may be a system that transmits each signal by using one antenna for example or may be a system that transmits each signal by using plural antennas.

(One Example of Configuration of Terminal Device According to Embodiment 1)

Next, a case of implementing the communication device 100 illustrated in FIG. 1 by a terminal device will be described by using FIG. 2. However, the communication device 100 is not limited to the terminal device and it is also possible to implement the communication device 100 by a communication device such as a base station device. As one example, a case of using DC-HSUPA as the communication system will be described.

Figure 2:
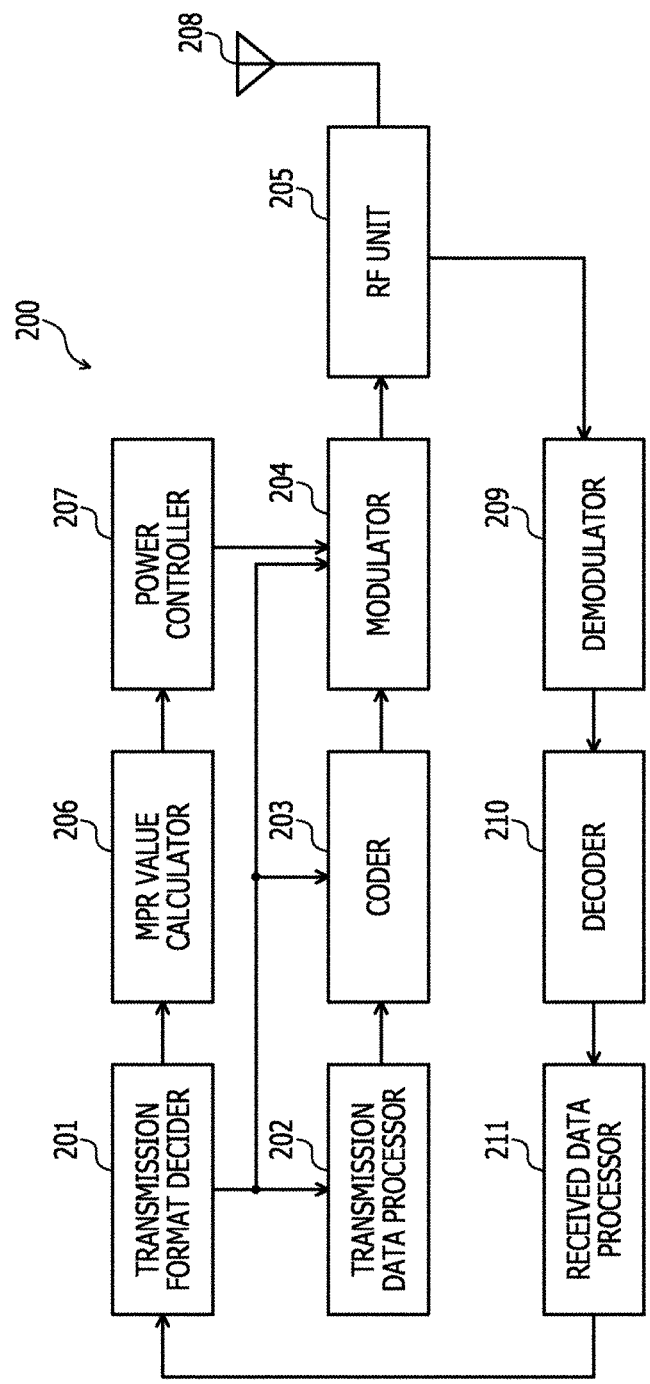
FIG. 2 is a diagram illustrating one example of a configuration of a terminal device according to embodiment 1.

FIG. 2 is a diagram illustrating one example of a configuration of a terminal device according to embodiment 1. A terminal device 200 illustrated in FIG. 2 is e.g. a terminal device such a mobile phone or a smartphone. The terminal device 200 communicates with a communication device such as a base station device.

The terminal device 200 includes a transmission format decider 201, a transmission data processor 202, a coder 203, a modulator 204, an radio frequency (RF) unit 205, an MPR value calculator 206, a power controller 207, and an antenna 208. Furthermore, the terminal device 200 includes a demodulator 209, a decoder 210, and a received data processor 211.

The transmission format decider 201 decides the transmission format in the terminal device 200 by using HSUPA control information output from the received data processor 211. The HSUPA control information includes information indicating the assignment of resources when transmission in the HSUPA system is carried out for example.

Then, the transmission format decider 201 outputs information on the transmission format indicating the decided transmission format to the transmission data processor 202, the coder 203, the modulator 204, and the MPR value calculator 206. The information on the transmission format includes e.g. the size of transport block, the spreading factor of each physical channel, the modulation scheme, the amplitude ratio information (gain factor β), and so forth. The above-described modulation parameters are included in this information on the transmission format.

Furthermore, the information on the transmission format includes e.g. the number of multiplexed codes of enhanced-dedicated physical data channel (E-DPDCH). Moreover, the information on the transmission format includes e.g. the amplitude value of the reference channel (DPCCH) serving as the basis of the amplitude of the gain factor β.

The modulation scheme is e.g. binary phase shift keying (BPSK), 4 pulse amplitude modulation (4PAM), or the like. The BPSK is one kind of phase shift keying scheme and is a scheme that modulates 1-bit data to 1 symbol for example. The 4PAM is a scheme that changes the amplitude of a pulse according to a modulation signal and is a scheme that modulates 2-bit data to 1 symbol for example.

Besides, the modulation scheme may be e.g. quadrature phase shift keying (QPSK), 16 quadrature amplitude modulation (16QAM), 64QAM, or the like.

The transmission data processor 202 generates transmission data with the size of transport block included in the information on the transmission format specified by the transmission format decider 201, and outputs the generated transmission data to the coder 203.

The coder 203 codes the transmission data output from the transmission data processor 202 on the basis of the transmission format indicated by the information on the transmission format output from the transmission format decider 201, and outputs the coded data to the modulator 204.

The modulator 204 modulates the coded data output from the coder 203 by using the information on the transmission format output from the transmission format decider 201, and outputs a baseband transmission signal obtained by the modulation to the RF unit 205. The RF unit 205 converts the baseband transmission signal output from the modulator 204 to a signal of a radio frequency band and transmits the converted signal via the antenna 208.

The MPR value calculator 206 calculates an MPR value defined by e.g. the following expression (1) by using the information on the transmission format output from the transmission format decider 201 and outputs the calculation result to the power controller 207. The following expression (1) is one example of an MPR value calculation expression defined in the specification of the 3GPP (3rd Generation Partnership Project).

MPR=MAX(CM−1,0)

$$CM=CEIL(\{20\times\log 10(v\_norm^3)_{rms}-20\times\log 10(v\_norm\_ref^3)_{rms}\}/k, 0.5) \quad (1)$$

In the above expression (1), v_norm denotes the voltage value (amplitude) of a normalized transmission signal. rms (root mean square) denotes a root mean square. v_norm_ref denotes the voltage value of a reference signal. 20×log 10(v_norm_ref³)$_{rms}$ denotes the mean square of the reference signal amplitude (constant: 1.52 dB). k denotes a constant decided from the transmission format. CEIL(X, 0.5) is an operation of rounding up X in units of 0.5 dB.

The power controller 207 controls the gain factor β by which the physical channel (hereinafter, referred to as the "channel") is multiplied in the modulator 204 by using the calculation result of the MPR value output from the MPR value calculator 206. The modulator 204 modulates the coded data output from the coder 203 by using the gain factor β controlled by the power controller 207. Controlling β in this manner makes it possible to control the transmission power of the signal to be transmitted by the RF unit 205.

Furthermore, the RF unit 205 converts a control signal that is received via the antenna 208 and is for carrying out HSUPA radio communications from a radio frequency band to a baseband band, and outputs the converted control signal to the demodulator 209. The demodulator 209 demodulates the control signal output from the RF unit 205 and outputs the demodulated control signal to the decoder 210.

The decoder 210 decodes the control signal output from the demodulator 209 and outputs control data obtained by the decoding to the received data processor 211. The received data processor 211 extracts HSUPA control information from the control data decoded by the decoder 210 and outputs the extracted HSUPA control information to the transmission format decider 201.

(One Example of Configuration of Modulator According to Embodiment 1)

Figure 3:
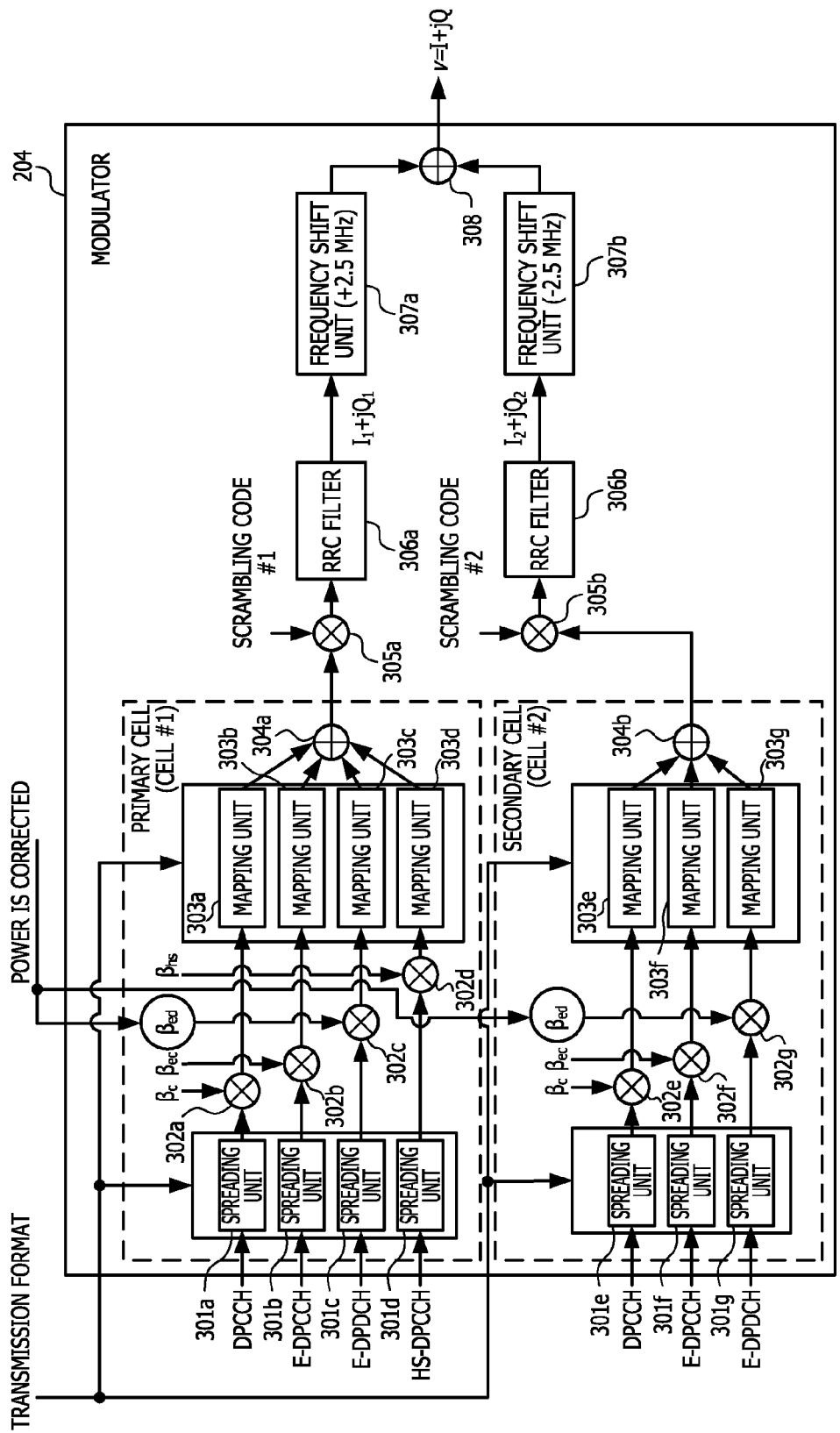
FIG. 3 is a diagram illustrating one example of a configuration of a modulator according to embodiment 1.

FIG. 3 is a diagram illustrating one example of a configuration of a modulator according to embodiment 1. As illustrated in FIG. 3, signals of plural channels are input to the modulator 204. The plural channels include e.g. DPCCH and enhanced-DPCCH (E-DPCCH). Furthermore, the plural channels include e.g. E-DPDCH and high speed-DPCCH (HS-DPCCH).

The modulator 204 modulates the signals of the respective channels for each of carriers corresponding to a P (Primary) cell and an S (Secondary) cell. The modulator 204 includes spreading units 301a to 301g, multipliers 302a to 302g, IQ mapping units 303a to 303g, adders 304a and 304b, and multipliers 305a and 305b. Furthermore, the modulator 204 includes root raised cosine (RRC) filters 306a and 306b, frequency shift units 307a and 307b, and an adder 308.

The spreading units 301a to 301g, the multipliers 302a to 302g, and the IQ mapping units 303a to 303g are provided corresponding to the plural channels. The spreading units 301a to 301g spread the input signals of the respective channels on the basis of the spreading code decided by the transmission format decider 201 and each output the spread signal to a corresponding one of the multipliers 302a to 302g. The spreading code is e.g. a channelization code for spreading modulation of each channel.

The multipliers 302a to 302g adjust the amplitude of the spread signals by multiplying the signals output from the spreading units 301a to 301g by the gain factor β decided by the transmission format decider 201. The multipliers 302a to 302g each output the spread signal resulting from the amplitude adjustment to a corresponding one of the IQ mapping units 303a to 303g.

The IQ mapping units 303a to 303d in the P cell perform mapping of the spread signals output from the multipliers 302a to 302d into an I (Inphase)-component and a Q (Quadrature)-component as prescribed in each channel in advance, and output the spread signals resulting from the mapping to the adder 304a. The adder 304a adds the spread signals output from the IQ mapping units 303a to 303d for each of the I-component and the Q-component to generate an IQ complex signal and output the IQ complex signal to the multiplier 305a.

The multiplier 305a multiplies the signal output from the adder 304a by a scrambling code #1 of the P cell and outputs the signal resulting from the multiplication by the scrambling code #1 to the RRC filter 306a. The scrambling code is e.g. a code specified by a base station device when the channels are set up. The scrambling code may be different from cell to cell.

The RRC filter 306a corrects the waveform of the signal output from the multiplier 305a and outputs the signal ($I_1+jQ_1$) resulting from the waveform correction to the frequency shift unit 307a. The frequency shift unit 307a shifts the frequency of the signal output from the RRC filter 306a by e.g. +2.5 MHz and outputs the signal resulting from the frequency shift to the adder 308.

The IQ mapping units 303e to 303g in the S cell perform mapping of the spread signals output from the multipliers 302e to 302g into an I-component and a Q-component as prescribed in each channel in advance, and output the spread signals resulting from the mapping to the adder 304b. The adder 304b adds the spread signals output from the IQ mapping units 303e to 303g for each of the I-component and the Q-component to generate an IQ complex signal and output the IQ complex signal to the multiplier 305b.

The multiplier 305b multiplies the signal output from the adder 304b by a scrambling code #2 of the S cell and outputs the signal resulting from the multiplication by the scrambling code #2 to the RRC filter 306b. The RRC filter 306b corrects the waveform of the signal output from the multiplier 305b and outputs the signal ($I_2+jQ_2$) resulting from the waveform correction to the frequency shift unit 307b.

The frequency shift unit 307b shifts the frequency of the signal output from the RRC filter 306b by e.g. −2.5 MHz and outputs the signal resulting from the frequency shift to the adder 308. It suffices for the amount of frequency shift by the frequency shift units 307a and 307b to be a given amount (e.g. 5 MHz) as a total relative amount. The individual amounts of frequency shift are not limited to the above-described value and may be different values. Furthermore, for example, a way may be employed in which only one of the frequency shift units 307a and 307b is made to shift the frequency by +5 MHz or −5 MHz and the other is not made to shift the frequency.

The adder 308 adds the signal output from the frequency shift unit 307a and the signal output from the frequency shift unit 307b and outputs the signal (I+jQ) resulting from the addition to the RF unit 205 (see FIG. 2).

(Calculation of Time Average Value of Power of Transmission Waveform)

The MPR value calculator 206 calculates $(v\_norm^3)_{rms}$ in the above expression (1) as the time average value of an exponential of the transmission waveform in order to calculate an MPR value. First, calculation of the time average value of an exponential of the transmission waveform in single cell (SC)-HSUPA will be described. When the signal after the passing through the adder 308 is defined as I+jQ and it is assumed that two channels x and y are included, the I-component and the Q-component can be represented as the following expression (2). FIG. 3 illustrates the configuration of the DC-HSUPA. In the case of the SC-HSUPA, the S cell does not exist and thus I+jQ is equivalent to $I_1+jQ_1$.

$$I = \beta_x a_{xI} + \beta_y a_{yI}$$

$$Q = \beta_x a_{xQ} + \beta_y a_{yQ} \qquad (2)$$

In the above expression (2), $\beta_x$ and $\beta_y$ denote the gain factors of the channels x and y and $a_{xI}$, $a_{yI}$, $a_{xQ}$, and $a_{yQ}$ denote the I-component and the Q-component of the channels x and y calculated from the modulation parameter excluding the gain factor β. When attention is paid to the definition expression of CM in the above expression (1), it suffices to obtain the mean sixth power of the amplitude, i.e. the mean cube of the power, for $(v\_norm^3)_{rms}^2$ in calculation of a CM value by use of expression (17) to be described later because rms means a root mean square. The relationship between $(v\_norm^3)_{rms}^2$ and the cube of the power can be represented as the following expression (3).

$$(v\_norm^3)_{rms}^2 = \langle (I^2 + Q^2)^3 \rangle = \qquad (3)$$
$$\langle I^6 + 3I^4Q^2 + 3I^2Q^4 + Q^6 \rangle = \langle I^6 \rangle + 3\langle I^4Q^2 \rangle + 3\langle I^2Q^4 \rangle + \langle Q^6 \rangle$$

In the above expression (3), <X> denotes a time average operation of X. As one example, when the above expression (2) is substituted into $\langle I^2Q^4 \rangle$ and the resulting expression is developed, $\langle I^2Q^4 \rangle$ can be represented as the following expression (4).

$$\langle I^2Q^4 \rangle = \qquad (4)$$
$$\langle a_{xI}^2 a_{xQ}^4 \rangle \beta_x^6 + (6\langle a_{xI}^2 a_{xQ}^2 a_{yQ}^2 \rangle + 8\langle a_{xI} a_{yI} a_{xQ}^3 a_{xQ} \rangle + \langle a_{yI}^2 a_{xQ}^4 \rangle) \beta_x^4 \beta_y^2 +$$
$$(6\langle a_{yI}^2 a_{xQ}^2 a_{yQ}^2 \rangle + 8\langle a_{xI} a_{yI} a_{xQ} a_{yQ}^3 \rangle + \langle a_{xI}^2 a_{yQ}^4 \rangle) \beta_x^2 \beta_y^4 + \langle a_{yI}^2 a_{yQ}^4 \rangle \beta_x^6$$

In the process of the calculation of the above expression (4), a term including $a_{xI}$, $a_{yI}$, $a_{xQ}$, or $a_{yQ}$ to the power of an odd number becomes 0 when being time-averaged because of the randomness of $a_{xI}$, $a_{yI}$, $a_{xQ}$, and $a_{yQ}$. On the other hand, the average value of a term that includes all of $a_{xI}$, $a_{yI}$, $a_{xQ}$, and $a_{yQ}$ and in which only one element is cubed does not become 0 because of restrictions of hybrid phase shift keying (HPSK) modulation.

Each correlation time average value represented in < > in the right side of the above expression (4) is uniquely determined by the spreading code of the channels among which the correlation is taken, the modulation scheme, the spreading factor, and so forth. Therefore, it is possible to calculate and hold the correlation time average values in advance as coefficient value data of coefficient tables (see first and second coefficient tables 400a and 400b in FIG. 4) according to the transmission format.

Regarding not only the correlation time average values represented in the above expression (4) but also all of the other correlation time average values obtained by substituting the above expression (2) into the above expression (3) and developing the resulting expression, results obtained by calculation and organization in a similar manner are held as coefficient value data of the coefficient tables. The MPR value calculator 206 calculates $(v\_norm^3)_{rms}^2$ by reading the coefficient value data selected according to the combination of the transmission format and the target channel and performing a product-sum operation with the gain factor $\beta$ of the target channel.

In the DC-HSUPA, the MPR value is calculated in consideration of the correlation of the channels between the carriers and the power allocation between the carriers. In the DC-HSUPA, the signal (I+jQ) output from the adder 308 can be represented as the following expression (5).

$$I+jQ=\{(I_1+jQ_1)e^{jwt}+(I_2+jQ_2)e^{-jwt}\} \quad (5)$$

In the above expression (5), $w=2\pi\times(2.5\times10^6)$ holds. $e^{\pm jwt}$ denotes frequency shift by $\pm 2.5$ MHz. This allows $(v\_norm^3)_{rms}^2$ to be represented as the following expression (6).

$$\{(v\_norm^3)_{rms}\}^2 = \quad (6)$$
$$\langle\{(I+jQ)^3\}^2\rangle = \langle[\{(I_1+jQ_1)e^{jwt}+(I_2+jQ_2)e^{-jwt}\}^3]^2\rangle =$$
$$\ldots = \langle\{(I_1+I_2)^2+(Q_1+Q_2)^2\}^3\rangle$$

A term that appears through development of $\langle\{(I+jQ)^3\}^2\rangle$ and includes $I_1$, $Q_1$, $I_2$, or $Q_2$ to the power of an odd number and a term including the carrier frequency become 0 when being time-averaged. As a result, it turns out that the expression becomes the same format as the above expression (3), which is to multiplex channels for each of the I-component and the Q-component and calculate the cube of the power value, irrespective of the difference in the carrier frequency between the carriers.

Here, suppose that two channels x and y are included in the transmission signal as in the above expression (2). When $\langle I^2Q^4\rangle$ as one element in the above expression (3) is taken as one example, $\langle I^2Q^4\rangle$ can be represented as the above expression (4). In $\langle a_{xI}a_{yI}a_{xQ}^3a_{yQ}\rangle$ as one element in the coefficient of $\beta_x^4\beta_y^2$ in this expression (4), a correlation appears in the case of the above-described SC-HSUPA. In the case of the SC-HSUPA, each of the I-component and the Q-component is multiplied by the same scrambling code to become 1 and therefore is not affected by the scrambling code.

In the DC-HSUPA, in the case in which the channel x and the channel y are each transmitted from different cells, a correlation similarly appears when the same scrambling code is applied between the P cell and the S cell. On the other hand, in the case in which the channel x and the channel y are each transmitted from different cells, the correlation disappears and $\langle a_{xI}a_{yI}a_{xQ}^3a_{yQ}\rangle=0$ holds when the scrambling code is different between the two cells. Similarly, $\langle a_{xI}a_{yI}a_{xQ}a_{yQ}^3\rangle$ also becomes 0.

As above, in the case of the DC-HSUPA, regarding the term that includes all of $a_{xI}$, $a_{yI}$, $a_{xQ}$, and $a_{yQ}$ and in which only one element is cubed, the value differs depending on whether the combination of scrambling codes is a combination of the same scrambling codes or a combination of different scrambling codes.

Furthermore, also in the DC-HSUPA, a component including an element to the power of an even number is not affected by the scrambling code because of multiplication by the same value. Therefore, if there is a difference in the scrambling code, $\langle I^2Q^4\rangle$ in the DC-HSUPA can be represented as the following expression (7).

$$\langle I^2Q^4\rangle = \langle a_{xI}^2 a_{xQ}^4\rangle\beta_x^6 + (6\langle a_{xI}^2 a_{xQ}^2 a_{yQ}^2\rangle + \langle a_{xI}^2 a_{yQ}^4\rangle)\beta_x^4\beta_y^2 + \quad (7)$$
$$(6\langle a_{yI}^2 a_{xQ}^2 a_{yQ}^2\rangle + \langle a_{xI}^2 a_{yQ}^4\rangle)\beta_x^2\beta_y^4 + \langle a_{yI}^2 a_{yQ}^4\rangle\beta_y^6$$

Furthermore, if there is no difference in the scrambling code, $\langle I^2Q^4\rangle$ in the DC-HSUPA can be represented as the above expression (4). As above, in the case of the DC-HSUPA, the coefficient value data differs depending on the combination of the scrambling codes used in the respective cells. For this reason, in the terminal device 200, two coefficient tables (see the first and second coefficient tables 400a and 400b in FIG. 4) according to the combination of the scrambling codes are prepared in advance. This allows the terminal device 200 to select the coefficient table according to the combination of the scrambling codes and obtain the coefficient value data.

Furthermore, because the power allocated to the respective carriers differs at the time of transmission, the IQ components at the time of transmission in the DC-HSUPA can be represented as the following expression (8).

$$I=\beta_x a_{xI}+\alpha\times\beta_y a_{yI}$$
$$Q=\beta_x a_{xQ}+\alpha\times\beta_y a_{yQ} \quad (8)$$

Here, $\alpha$ is the ratio of the amplitude of the reference channel between the plural carriers and is the amplitude ratio between the DPCCH in the P cell and the DPCCH in the S cell for example. Furthermore, the gain factor $\beta$ of each channel is represented on the basis of the DPCCH in the respective carriers. For example, the gain factor $\beta$ of the DPCCH is represented as 1 in each cell. The respective DPCCHs in different carriers are different in the amplitude as the basis depending on the power allocation to the respective carriers. Therefore, by multiplication by the amplitude ratio $\alpha$ of the DPCCH between the P cell and the S cell, the gain factor $\beta$ of each cell can be corrected to a relative value employing the DPCCH of the P cell as the basis for example.

The amplitude of the DPCCH of each carrier is calculated by the transmission format decider 201 (see FIG. 2) for example and thus the MPR value calculator 206 can obtain the amplitude ratio $\alpha$ of the DPCCH. Here, to calculate $(v\_norm^3)_{rms}^2$ in consideration of $\alpha$, $\beta_y$ in the above expression (7) is replaced by $\alpha\times\beta_y$. This can represent the above expression (7) as an expression indicating the correlation of the channels defined in consideration of the power ratio between the carriers like the following expression (9).

$$\langle I^2Q^4\rangle = \langle a_{xI}^2 a_{xQ}^4\rangle\beta_x^6 + \alpha^2\times(6\langle a_{xI}^2 a_{xQ}^2 a_{yQ}^2\rangle + \langle a_{yI}^2 a_{xQ}^4\rangle)\beta_x^4\beta_y^2 + \quad (9)$$
$$\alpha^4\times(6\langle a_{yI}^2 a_{xQ}^2 a_{yQ}^2\rangle + \langle a_{xI}^2 a_{yQ}^4\rangle)\beta_x^2\beta_y^4 + \alpha^6\times\langle a_{yI}^2 a_{yQ}^4\rangle\beta_y^6$$

Furthermore, if there is no difference in the scrambling codes, the MPR value calculator 206 uses a modified expression of the above expression (4) obtained by replacing $\beta_y$ represented in the above expression (4) by $\alpha\times\beta_y$. In this manner, the MPR value calculator 206 corrects the gain factor β by the amplitude ratio α of the DPCCH of each cell. Then, the MPR value calculator 206 performs a product-sum operation with coefficient values of the coefficient table selected according to the combination of the scrambling codes and the corrected gain factor β and thereby can calculate the MPR value of the DC-HSUPA with a small amount of operation.

The MPR value calculated in this manner is output to the power controller 207. Then, the gain factor $\beta_{ed}$ of the E-DPDCH is corrected to power according to the MPR value by the power controller 207.

In the above description, the case in which two channels x and y are used is described for simplification of description. However, $(v\_norm^3)_{rms}^2$ is obtained by three times of multiplication by the transmission signal and therefore calculation of the correlation of at most three channels is performed. For example, when three channels are defined as x, y, and z, there are the following combinations as the combinations of the gain factors β.

$\beta_x^6, \beta_y^6, \beta_z^6$
$\beta_x^4\beta_y^2, \beta_x^4\beta_z^2, \beta_y^4\beta_x^2, \beta_y^4\beta_z^2, \beta_z^4\beta_x^2, \beta_z^4\beta_y^2$
$\beta_x^2\beta_y^2\beta_z^2$ The MPR value calculator 206 may calculate coefficient values in advance about the respective combinations of the above-described gain factors β.

Here, an expression when the above expression (2) is extended to three channels can be represented as the following expression (10).

$$I = \beta_x a_{xI} + \beta_y a_{yI} + \beta_z a_{zI}$$
$$Q = \beta_x a_{xQ} + \beta_y a_{yQ} + \beta_z a_{zQ} \quad (10)$$

When the above expression (10) is substituted into the above expression (3) and the resulting expression is developed, the following expression (11) is obtained.

$$\{(v\_norm^3)_{rms}\}^2 = \Sigma_x \Sigma_y \Sigma_z k(x,y,z) \beta_x^2 \beta_y^2 \beta_z^2 \quad (11)$$

In the above expression (11), k(x, y, z) denotes the sum of the correlation time average value with respect to the combination of the channels x, y, and z. The channels x, y, and z can overlap (namely, repeated combinations are taken). When being represented by #1 and #2 indicating different cells in FIG. 3 for example, the channels x, y, and z correspond to channels represented in the following expression (12).

x,y,z∈{DPCCH#1,E-DPCCH#1,E-DPDCH#1,HS-DPCCH,

DPCCH#2,E-DPCCH#2,E-DPDCH#2} (12)

When the channels x, y, and z overlap, k(x, x, x) is the coefficient of a term of $\beta_x^6$ and k(x, x, y) is the coefficient of a term of $\beta_x^4 \beta_y^2$.

If the number of channels is three, when the amplitude ratio α of the DPCCH between the carriers is considered regarding the above expression (11), the following expression (13) is obtained.

$$\{(v\_norm^3)_{rms}\}^2 = \Sigma_x \Sigma_y \Sigma_z \{k(x,y,z) \times (\alpha_x \beta_x)^2 (\alpha_y \beta_y)^2 (\alpha_z \beta_z)^2\} \quad (13)$$

When the P cell (cell #1) is employed as the basis of the amplitude of the DPCCH, the following expression (14) is obtained regarding n∈{x, y, z}.

if(n∈cell#1)$\alpha_n$=1 if(n∈cell#N)$\alpha_n = \alpha_{N-1}$(N>1) (14)

As the coefficient k(x, y, z), a value according to the combination of the transmission format and the channel is acquired from the first coefficient table 400a or the second coefficient table 400b selected according to the combination of scrambling codes. If three channels are used, the number of kinds of combinations of the scrambling codes (namely, an identity among scrambling codes) is three: all are the same; two are the same; all are different, for example. The number n of $\alpha_n$ in the above expression (14) is a value obtained by subtracting 1 from N indicating the number of the cell and corresponds to the number of $\alpha_1$ and $\alpha_2$ (see FIG. 11) in embodiment 2 to be described later for example.

(One Example of Configuration of MPR Value Calculator According to Embodiment 1)

Figure 4:
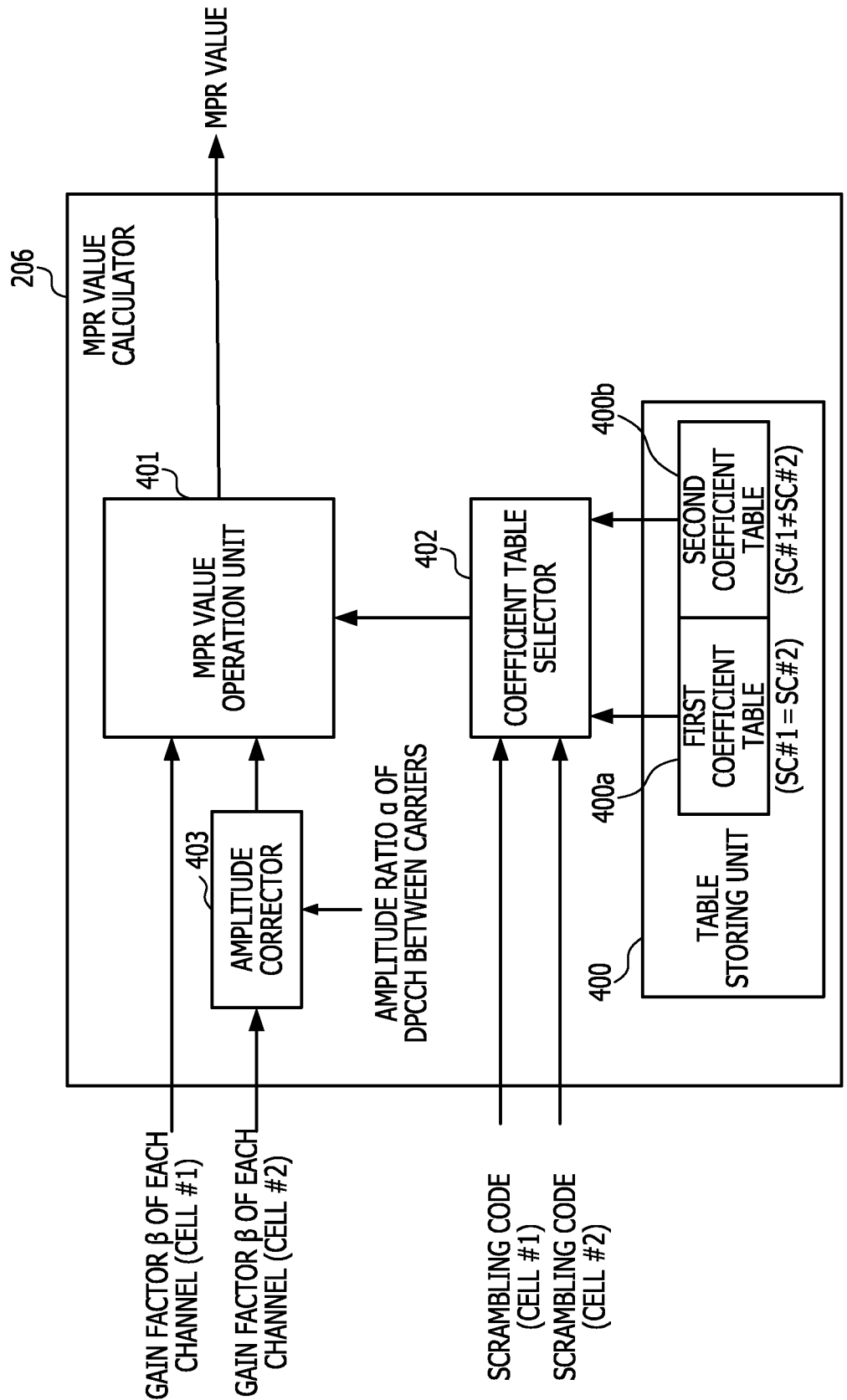
FIG. 4 is a diagram illustrating one example of a configuration of an MPR value calculator according to embodiment 1.

FIG. 4 is a diagram illustrating one example of a configuration of an MPR value calculator according to embodiment 1. As illustrated in FIG. 4, the MPR value calculator 206 includes a table storing unit 400, an MPR value operation unit 401, a coefficient table selector 402, and an amplitude corrector 403.

The table storing unit 400 stores the first coefficient table 400a and the second coefficient table 400b. The first coefficient table 400a stores coefficient value data used when the scrambling codes of the two cells #1 and #2 (P cell and S cell, respectively) are the same. The second coefficient table 400b stores coefficient value data used when the scrambling codes of the two cells #1 and #2 are different.

The coefficient table selector 402 acquires the scrambling codes of the respective cells #1 and #2 from the modulator 204. The coefficient table selector 402 determines whether difference of the scrambling codes of the respective cells #1 and #2 is present or not, and selects one of the first coefficient table 400a and the second coefficient table 400b according to the determination result. Then, the coefficient table selector 402 acquires the coefficient value data from the selected first or second coefficient table 400a or 400b.

The coefficient table selector 402 selects the first coefficient table 400a if the scrambling codes of the respective cells #1 and #2 do not differ for example. Furthermore, the coefficient table selector 402 selects the second coefficient table 400b if the scrambling codes of the respective cells #1 and #2 differ for example. The coefficient table selector 402 outputs the coefficient value data acquired from the selected first coefficient table 400a or second coefficient table 400b to the MPR value operation unit 401.

The amplitude ratio α of the DPCCH between the cells #1 and #2, calculated by the MPR value calculator 206, is input to the amplitude corrector 403. Furthermore, the gain factor β of the cell #2 output from the transmission format decider 201 is input to the amplitude corrector 403. For example, the DPCCH of one cell #1 of the two cells #1 and #2 is set to 1 and employed as the basis. Therefore, the amplitude corrector 403 multiplies the gain factor β of the other cell #2 by the amplitude ratio α of the DPCCH of the respective cells to thereby correct the gain factor β. Furthermore, the amplitude corrector 403 outputs the gain factor β multiplied by the amplitude ratio α of the DPCCH to the MPR value operation unit 401.

The coefficient value data acquired by the coefficient table selector 402 is input to the MPR value operation unit 401. Furthermore, the gain factor β of the cell #1 output from the transmission format decider 201 is input to the MPR value operation unit 401. Moreover, to the MPR value operation unit 401, the gain factor β of the cell #2 that is output from the amplitude corrector 403 and is corrected by the amplitude ratio α of the DPCCH of the respective cells #1 and #2 is input.

The MPR value operation unit 401 executes a product-sum operation by using the coefficient value data from the coefficient table selector 402, the gain factor β from the transmission format decider 201, and the corrected gain factor β from the amplitude corrector 403. This allows the MPR value calculator 206 to calculate $(v\_norm^3)_{rms}^2$ and calculate the MPR value.

(One Example of Transmission Format of Each Cell)

FIG. 5 is a diagram illustrating one example of a transmission format of each cell. A transmission format 500 illustrated in FIG. 5 is the transmission format of each cell decided and output by the transmission format decider 201. As illustrated in FIG. 5, the transmission format 500 includes a Case No field, a field of the number of E-DPDCH codes, an E-DPDCH spreading factor (SF) field, and a modulation scheme field.

Case No is a number to identify a format data 501. The number of E-DPDCH codes is the number of multiplexed codes of the E-DPDCH. The E-DPDCH spreading factor is the magnification ratio when data is spread. The modulation scheme is a modulation scheme such as BPSK and 4PAM.

By setting information in each field, the format data 501 of each of the combinations of Case No, the number of codes of the E-DPDCH, the spreading factor of the E-DPDCH, and the modulation scheme is stored in the transmission format 500.

(One Example of Transmission Format in which Plural Cells are Combined)

Figure 6:
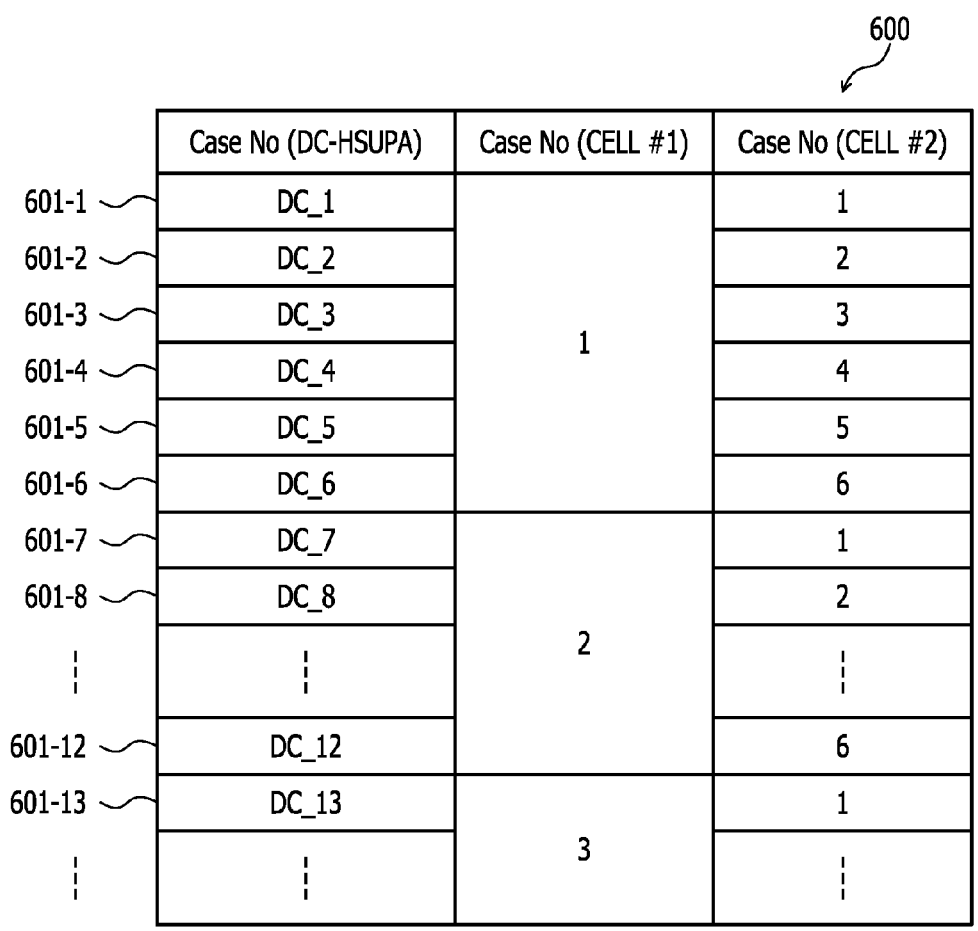
FIG. 6 is a diagram illustrating one example of a transmission format in which plural cells are combined.

FIG. 6 is a diagram illustrating one example of a transmission format in which plural cells are combined. A transmission format 600 illustrated in FIG. 6 is a transmission format that is decided and output by the transmission format decider 201 and in which plural cells are combined. The transmission format 600 is a format obtained by combining the same number of transmission formats 500 (see FIG. 5) as the number of cells (two). The transmission format 600 is a format with which Case No of each cell represented in the transmission format 500 is associated.

The transmission format 600 includes a Case No (DC-HSUPA) field, a Case No (cell #1) field, and a Case No (cell #2) field. Case No (DC-HSUPA) is a number to identify a format data 601 indicating the combination of Case No (cell #1) and Case No (cell #2). Case No (cell #1) is a number for identifying the format data 501 (see FIG. 5) of the cell #1. Furthermore, Case No (cell #2) is a number for identifying the format data 501 (see FIG. 5) of the cell #2.

By setting information in each field, the format data 601 of each of the combinations of Case No (DC-HSUPA), Case No (cell #1), and Case No (cell #2) is stored in the transmission format 600.

(One Example of Respective Coefficient Tables)

FIG. 7 is a diagram illustrating one example of respective coefficient tables. The first coefficient table 400a stores coefficient value data 701 of each of coefficient terms corresponding to each Case No (DC-HSUPA) represented in the transmission format 600 (see FIG. 6). For example, as illustrated in FIG. 7, the first coefficient table 400a includes the coefficient terms and Case No (DC-HSUPA), namely two factors.

The coefficient term k(x, y, z) indicates the combination of the gain factors β in calculation of the correlation of the channels in $(v\_norm^3)_{rms}^2$. For example, even the same channels are treated as different channels if the cell is different. #1 in the coefficient term k indicates the channel that belongs to the cell #1 (P cell). #2 in the coefficient term k indicates the channel that belongs to the cell #2 (S cell).

For example, k(c#1, c#1, c#1) indicates A $\beta_{DPCCH\#1}^2\beta_{DPCCH\#1}^2\beta_{DPCCH\#1}^2$ $(=\beta_{DPCCH\#1}^6)$. Furthermore, k(ed#1, ed#1, c#1) indicates $\beta_{E\text{-}DPDCH\#1}^2\beta_{E\text{-}DPDCH\#1}^2\beta_{DPCCH\#1}^2$ $(=\beta_{E\text{-}DPDCH\#1}^4\beta_{DPCCH\#1}^2)$. Moreover, k(c#1, ed#2, c#2) indicates $\beta_{DPCCH\#1}^2\beta_{E\text{-}DPDCH\#2}^2\beta_{DPCCH\#2}^2$. In addition, k(c#2, c#2, c#2) indicates $\beta_{DPCCH\#2}^2\beta_{DPCCH\#2}^2\beta_{DPCCH\#2}^2$ $(=\beta_{DPCCH\#2}^6)$.

Case No (DC-HSUPA) is a number to identify the format data 601 (see FIG. 6) indicating the combination of Case No (cell #1) and Case No (cell #2). When the coefficient value data 701-2 is taken as an example, if Case No (DC-HSUPA) is DC_1, "42" is selected as the coefficient value of $\beta_{E\text{-}DPDCH\#1}^4\beta_{DPCCH\#1}^2$. Furthermore, in the coefficient value data 701-2, if Case No (DC-HSUPA) is DC_2, "120" is selected as the coefficient value of $\beta_{E\text{-}DPDCH\#1}^4\beta_{DPCCH\#1}^2$.

By setting information in each field, the coefficient value data 701 indicating the correlation time average value of each of the combinations of the coefficient term and Case No (DC-HSUPA) are stored in the first coefficient table 400a. In the first coefficient table 400a, the coefficient term is extended according to the combinations of the channels x and y and Case No (DC-HSUPA) is extended according to the combinations of the transmission formats.

Although Description of the Second Coefficient Table 400b is Omitted in FIG. 7, the second coefficient table 400b also includes a table configuration similar to that of the first coefficient table 400a for example and different coefficient value data from coefficient value data in the first coefficient table 400a are stored. In this manner, the terminal device 200 can acquire, from the first and second coefficient tables 400a and 400b, the coefficient value data 701 that corresponds to the combination of the modulation parameters of the plural physical channels and corresponds to whether or not difference of the scrambling codes is present.

(One Example of Hardware Configuration of Terminal Device)

Figure 8:
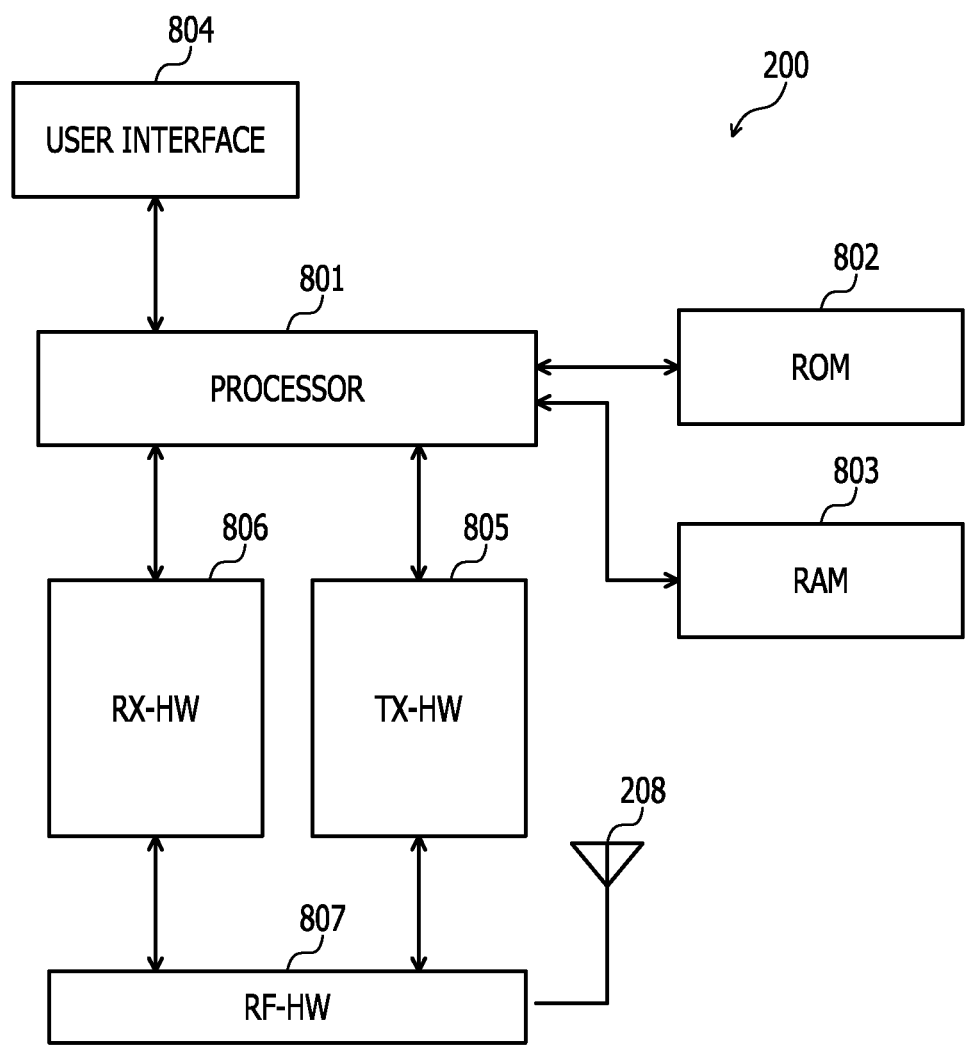
FIG. 8 is a diagram illustrating one example of a hardware configuration of a terminal device.

FIG. 8 is a diagram illustrating one example of a hardware configuration of a terminal device. The terminal device 200 includes a processor 801, a read only memory (ROM) 802, a random access memory (RAM) 803, a user interface 804, a transmit exchange-hardware (TX-HW) 805, a received exchange-HW (RX-HW) 806, an RF-HW 807, and the antenna 208.

The processor 801 is responsible for control of the whole of the terminal device 200. The processor 801 is implemented by e.g. a central processing unit (CPU), a digital signal processor (DSP), or the like. The ROM 802 stores programs such as a boot program and so forth. The RAM 803 is used as a work area of the processor 801.

The user interface 804 includes e.g. an input device that accepts operation input from a user, an output device that outputs information to a user, and so forth. The input device can be implemented by e.g. a touch panel, a key (e.g. keyboard), a remote control, or the like. The output device can be implemented by e.g. a touch panel, a display, a speaker, or the like.

The TX-HW 805 is hardware that codes transmission data and modulates the coded data. The RX-HW 806 is hardware that demodulates a control signal of a baseband band and decodes the modulated signal. The RF-HW 807 is hardware that converts a high-frequency signal received via the antenna 208 to a baseband signal and converts a modulated signal to a high-frequency signal to transmit the high-frequency signal via the antenna 208.

The functions of the transmission format decider 201, the transmission data processor 202, and the MPR value calculator 206 illustrated in FIG. 2 are implemented by causing the processor 801 to execute a program stored in the ROM 802 for example. Furthermore, the functions of the power controller 207 and the received data processor 211 are implemented by causing the processor 801 to execute a program stored in the ROM 802 for example.

Furthermore, the coder 203 and the modulator 204 illustrated in FIG. 2 are implemented by the TX-HW 805 for example. Moreover, the demodulator 209 and the decoder 210 illustrated in FIG. 2 are implemented by the RX-HW 806. In addition, the RF unit 205 illustrated in FIG. 2 is implemented by the RF-HW 807.

(One Example of Update Processing of Transmission Power of DPCCH)

Figure 9:
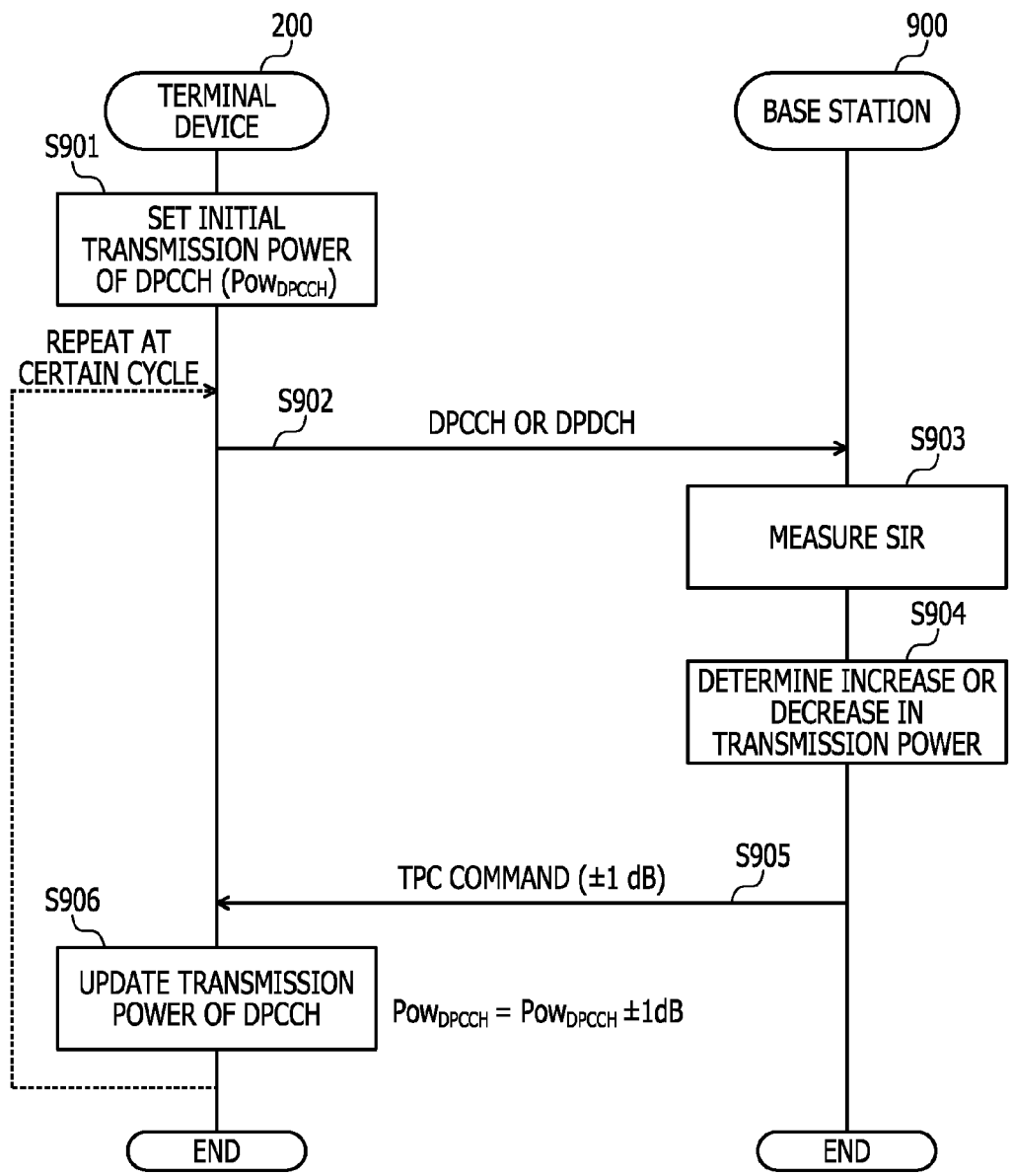
FIG. 9 is a sequence diagram illustrating one example of update processing of transmission power of dedicated physical control channel (DPCCH)

FIG. 9 is a sequence diagram illustrating one example of update processing of transmission power of DPCCH. As illustrated in FIG. 9, the terminal device 200 sets the initial transmission power ($Pow_{DPCCH}$) of the DPCCH at the start of communications (step S901). Next, the terminal device 200 transmits the DPCCH or the DPDCH to a base station 900 (step S902).

Upon receiving the DPCCH or the DPDCH from the terminal device 200, the base station 900 measures the ratio of the signal power to the interference power (signal to interference ratio: SIR) for estimating the quality of the radio transmission path (step S903). Next, the base station 900 makes a determination as to increase or decrease in the transmission power of the terminal device 200 so that the SIR may be kept steady (step S904).

The base station 900 transmits a transmit power control (TPC) command to the terminal device 200 on the basis of the determination result of increase or decrease in the transmission power (step S905) and ends the series of processing. The TPC command is control information and includes information instructing increase or decrease in the transmission power of the DPCCH. The width of the increase or decrease in the transmission power is e.g. ±1 dB and is specified by the base station 900 at the start of communications in advance.

The terminal device 200 updates the transmission power of the DPCCH in accordance with the TPC command received from the base station 900 (step S906) and ends the series of processing. The processing of the steps S902 to S906 is repeatedly executed every certain cycle.

In the case of the DC-HSUPA, the update of the transmission power illustrated in FIG. 9 is carried out for each carrier. When the transmission power [dB] of the DPCCH of the cell #1 (P cell) is defined as $Pow_{DPCCH1}$ and the transmission power [dB] of the DPCCH of the cell #2 (S cell) is defined as $Pow_{DPCCH2}$, the amplitude ratio α of the DPCCH employing the cell #1 as the basis can be represented as the following expression (15).

$$\alpha = \sqrt{\log 10(Pow_{DPCCH2})}/\sqrt{\log 10(Pow_{DPCCH1})} \quad (15)$$

When calculating the MPR value, the terminal device 200 uses the amplitude ratio α of the DPCCH obtained from the latest transmission power $Pow_{DPCCH1}$ and $Pow_{DPCCH2}$ of the DPCCH.

(One Example of Calculation Processing of MPR Value in Terminal Device According to Embodiment 1)

Figure 10:
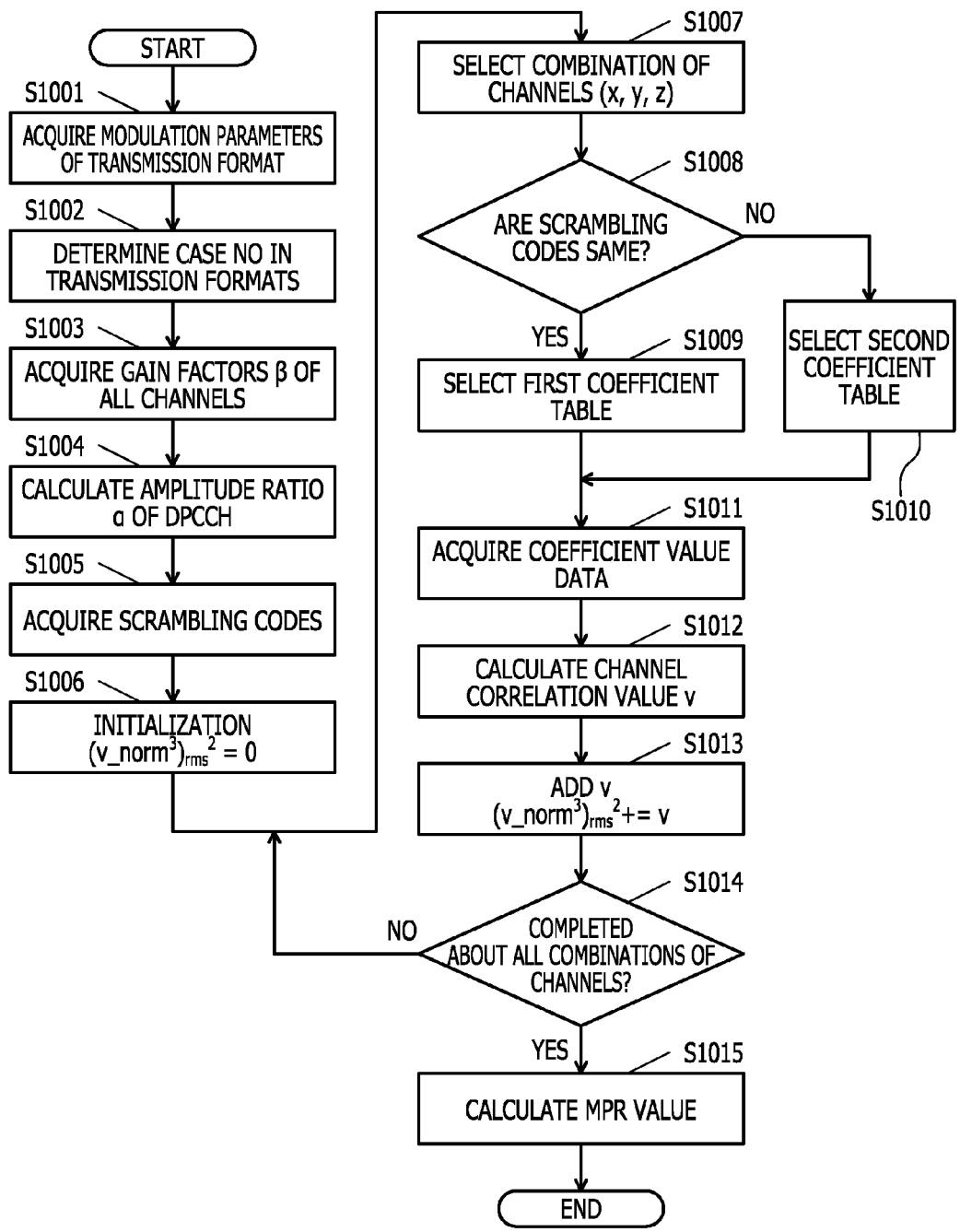
FIG. 10 is a flowchart illustrating one example of calculation processing of an MPR value in a terminal device according to embodiment 1.

FIG. 10 is a flowchart illustrating one example of calculation processing of an MPR value in a terminal device according to embodiment 1. As illustrated in FIG. 10, the terminal device 200 acquires the modulation parameters of the transmission format 500 (see FIG. 5) (step S1001). The modulation parameters of the transmission format 500 are the number of E-DPDCH codes, the E-DPDCH spreading factor, the modulation scheme, and so forth.

Next, by using the acquired modulation parameters, the terminal device 200 determines which Case No in the transmission format 500 and the transmission format 600 (see FIG. 6) the combination of the modulation parameters corresponds to (step S1002). Next, the terminal device 200 acquires the gain factors β of all channels of each cell (step S1003).

Next, the terminal device 200 calculates the amplitude ratio α of the DPCCH between the cells (step S1004). Next, the terminal device 200 acquires the scrambling code of each cell, used in the cell to which the respective channels belong (step S1005). Next, the terminal device 200 carries out initialization to set $(v\_norm^3)_{rms}^2 = 0$ (step S1006).

Next, the terminal device 200 selects the combination of the channels that has not yet been selected among the combinations (repeated combinations) of the channels (step S1007). Next, as a determination as to the combination of the scrambling codes of the respective cells acquired in the step S1005, the terminal device 200 determines whether or not the scrambling codes are the same (step S1008).

If the scrambling codes are the same (step S1008: Yes), the terminal device 200 selects the first coefficient table 400a (see FIG. 7) (step S1009) and makes transition to a step S1011. If the scrambling codes are different (step S1008: No), the terminal device 200 selects the second coefficient table 400b (see FIG. 7) (step S1010).

Next, the terminal device 200 acquires the coefficient value data 701 (see FIG. 7) of the coefficient term k(x, y, z) corresponding to Case No (DC-HSUPA) from the selected first coefficient table 400a or second coefficient table 400b (step S1011). Next, the terminal device 200 calculates a channel correlation value v by using the gain factors β acquired in the step S1003, the amplitude ratio α of the DPCCH calculated in the step S1004, and the coefficient value data 701 acquired in the step S1011 (step S1012). The channel correlation value v can be represented as the following expression (16) for example.

$$v = k(x,y,z) \times (\alpha_x \beta_x)^2 (\alpha_y \beta_y)^2 (\alpha_z \beta_z)^2 \quad (16)$$

Next, the terminal device 200 adds the channel correlation value v to $(v\_norm^3)_{rms}^2$ and substitutes the result into $(v\_norm^3)_{rms}^2$ (step S1013). Next, the terminal device 200 determines whether or not the calculation and addition of the channel correlation value v have been completed about all combinations (step S1014).

If the calculation and addition of the channel correlation value v have not been completed about all combinations (step S1014: No), the terminal device 200 makes transition to the step S1007. If the calculation and addition of the channel correlation value v have been completed about all combinations (step S1014: Yes), the terminal device 200 calculates the MPR value by using $(v\_norm^3)_{rms}^2$ obtained in the step S1013 and the above expression (1) (step S1015) and ends the series of processing. The terminal device 200 transmits the respective signals generated by the plural cells with the transmission power controlled on the basis of the MPR value calculated in the step S1015.

As described above, in the terminal device 200 according to embodiment 1, combinations of plural modulation parameters excluding the amplitude ratio information are calculated and stored in consideration of difference of the scrambling codes in advance. Thus, the correlation time average value for calculating the time average value of an exponential of the transmission waveform can be derived. Furthermore, the terminal device 200 can calculate the time average value of an exponential of the transmission waveform according to the power allocation to the respective carriers by a product-sum operation with use of the amplitude ratio α of the DPCCH of the respective carriers in addition to the derived correlation time average values and the gain factors β. Therefore, the terminal device 200 can calculate the MPR value of the maximum transmission power in the case of simultaneously transmitting the respective signals generated by plural carriers with a smaller amount of operation compared with the case of calculating the MPR value from the amplitude of a modulated transmission signal for example.

Furthermore, in the calculation of the MPR value, the terminal device 200 can derive the correlation time average value without calculating the correlation time average value by acquiring the correlation time average value stored in the first and second coefficient tables 400a and 400b. Therefore, the terminal device 200 can calculate the MPR value of the maximum transmission power in the case of simultaneously transmitting the respective signals generated by plural carriers with a small amount of operation.

Furthermore, the terminal device 200 acquires the correlation time average value according to the combination of the scrambling codes and therefore can easily derive the correlation time average value. Therefore, the terminal device 200 can calculate the MPR value of the maximum transmission power in the plural carriers with a small amount of operation.

In addition, the terminal device 200 can calculate the amplitude ratio α of the DPCCH between the carriers on the basis of the control information received from the base station 900. This allows the terminal device 200 to calculate the time average value of an exponential of the transmission waveform.

Furthermore, the terminal device 200 transmits a multiplexed signal whose transmission power is controlled on the basis of the calculated time average value of an exponential of the transmission waveform. This allows the terminal device 200 to transmit the multiplexed signal for which the maximum transmission power is reduced by using the MPR value calculated with a small amount of operation in the dual cells.

Embodiment 2

Next, embodiment 2 of the terminal device will be described. In embodiment 1, DC-HSUPA by two cells is described. In embodiment 2, HSUPA by three or more cells will be described. In embodiment 2, the different part from embodiment 1 will be described. Although HSUPA by three cells will be described in embodiment 2, the same applies also to HSUPA by four or more cells.

(One Example of Configuration of MPR Value Calculator According to Embodiment 2)

FIG. 11 is a diagram illustrating one example of a configuration of an MPR value calculator according to embodiment 2. In FIG. 11, the table storing unit 400 stores the first coefficient table 400a, the second coefficient table 400b, and a third coefficient table 1100. The first coefficient table 400a stores coefficient value data used when all of the scrambling codes of the cells #1, #2, and #3 are the same. The second coefficient table 400b stores coefficient value data used when two of the scrambling codes of the cells #1, #2, and #3 are the same. The third coefficient table 1100 stores coefficient value data used when all of the scrambling codes of the three cells #1, #2, and #3 are different.

The coefficient table selector 402 acquires the scrambling codes of the respective cells #1, #2, and #3 from the modulator 204. The coefficient table selector 402 determines the combination of the scrambling codes of the respective cells #1, #2, and #3 and selects one of the first coefficient table 400a, the second coefficient table 400b, and the third coefficient table 1100 according to the determination result. Then, the coefficient table selector 402 acquires the coefficient value data from the selected first, second, or third coefficient table 400a, 400b, or 1100.

The coefficient table selector 402 selects the first coefficient table 400a if all of the scrambling codes of the respective cells #1, #2, and #3 are the same for example. Furthermore, the coefficient table selector 402 selects the second coefficient table 400b if two of the scrambling codes of the respective cells #1, #2, and #3 are the same. Moreover, the coefficient table selector 402 selects the third coefficient table 1100 if all of the scrambling codes of the respective cells #1, #2, and #3 are different. The coefficient table selector 402 outputs the coefficient value data acquired from the selected first coefficient table 400a, second coefficient table 400b, or third coefficient table 1100 to the MPR value operation unit 401.

An amplitude ratio $\alpha_1$ of the DPCCH between the cells #1 and #2, calculated by the MPR value calculator 206, is input to a first amplitude corrector 403a. Furthermore, the gain factor β of the cell #2 output from the transmission format decider 201 is input to the first amplitude corrector 403a. For example, the DPCCH of the cell #1 of the cells #1 and #2 is set to 1 and employed as the basis. Therefore, the first amplitude corrector 403a multiplies the gain factor β of the cell #2 by the amplitude ratio $\alpha_1$ of the DPCCH between the cells #1 and #2 to thereby correct the gain factor β. The first amplitude corrector 403a outputs the gain factor β multiplied by the amplitude ratio $\alpha_1$ of the DPCCH to the MPR value operation unit 401.

An amplitude ratio $\alpha_2$ of the DPCCH between the cells #1 and #3, calculated by the MPR value calculator 206, is input to a second amplitude corrector 403b. Furthermore, the gain factor β of the cell #3 output from the transmission format decider 201 is input to the second amplitude corrector 403b. For example, the DPCCH of the cell #1 of the cells #1 and #3 is set to 1 and employed as the basis. Therefore, the second amplitude corrector 403b multiplies the gain factor β of the cell #3 by the amplitude ratio $\alpha_2$ of the DPCCH between the cells #1 and #3 to thereby correct the gain factor β. The second amplitude corrector 403b outputs the gain factor β multiplied by the amplitude ratio $\alpha_2$ of the DPCCH to the MPR value operation unit 401.

The coefficient value data acquired by the coefficient table selector 402 is input to the MPR value operation unit 401. Furthermore, the gain factor β of the cell #1 output from the transmission format decider 201 is input to the MPR value operation unit 401. Moreover, to the MPR value operation unit 401, the gain factor β of the cell #2 corrected by the amplitude ratio $\alpha_1$ of the DPCCH between the cells #1 and #2 is input from the first amplitude corrector 403a. In addition, to the MPR value operation unit 401, the gain factor β of the cell #3 corrected by the amplitude ratio $\alpha_2$ of the DPCCH between the cells #1 and #3 is input from the second amplitude corrector 403b.

The MPR value operation unit 401 executes a product-sum operation by using the coefficient value data from the coefficient table selector 402, the gain factors β from the transmission format decider 201, the first amplitude corrector 403a, and the second amplitude corrector 403b. This allows the MPR value calculator 206 to calculate the time average value of an exponential of the transmission waveform and calculate the MPR value.

(One Example of Calculation Processing of MPR Value in Terminal Device According to Embodiment 2)

Figure 12A:
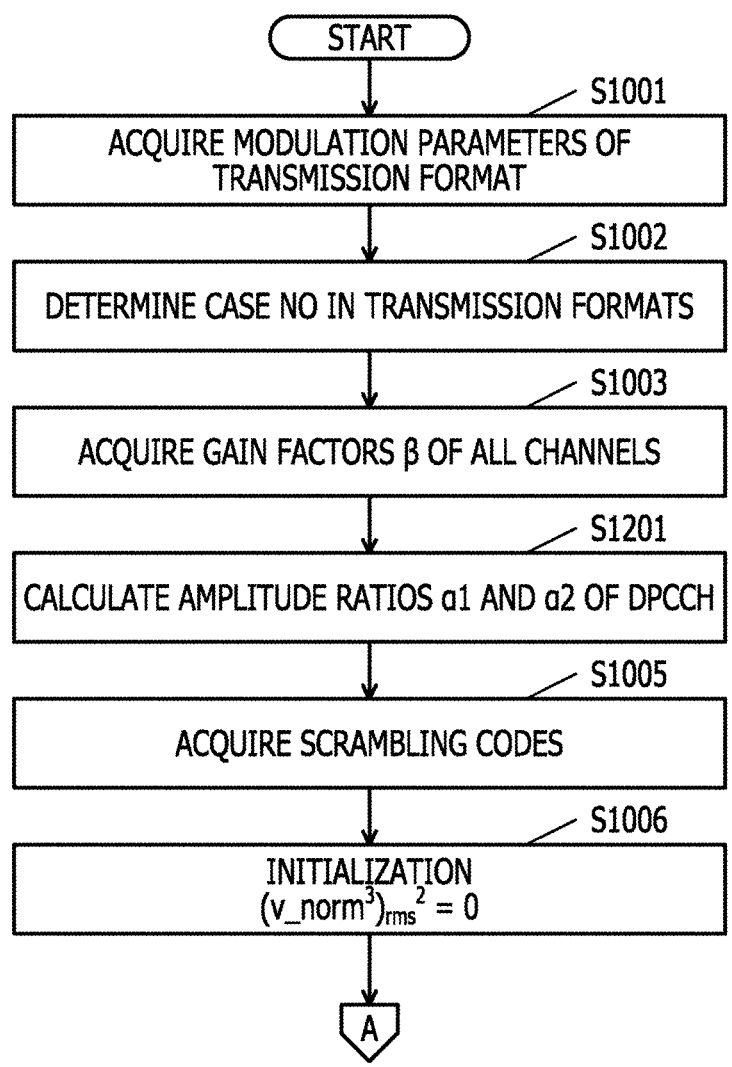
FIG. 12A is a (first) flowchart illustrating one example of calculation processing of an MPR value in a terminal device according to embodiment 2.

FIG. 12A is a (first) flowchart illustrating one example of calculation processing of an MPR value in a terminal device according to embodiment 2. FIG. 12B is a (second) flow-chart illustrating one example of calculation processing of an MPR value in a terminal device according to embodiment 2. In the processing illustrated in FIGS. 12A and 12B, steps S1201 to S1206 different from the steps in the processing illustrated in FIG. 10 will be described.

After acquiring the gain factors β of all channels of the respective cells #1, #2, and #3 (step S1003), the terminal device 200 calculates the amplitude ratios $\alpha_1$ and $\alpha_2$ of the DPCCH between the cells #1 and #2 and between the cells #1 and #3 (step S1201) and makes transition to the step S1005.

Furthermore, after selecting the combination of the channels that has not yet been selected among the combinations of the channels (step S1007), the terminal device 200 determines whether or not all of the three scrambling codes used in the cells #1, #2, and #3 to which the respective channels belong to are the same (step S1202). In the step S1202, the determination is made by using the scrambling codes acquired in the step S1005.

If all of the scrambling codes are the same (step S1202: Yes), the terminal device 200 selects the first coefficient table 400a (step S1203) and makes transition to the step S1011. If all of the three scrambling codes are not the same (step S1202: No), the terminal device 200 determines whether or not two of the three scrambling codes are the same (step S1204).

If two of the three scrambling codes are the same (step S1204: Yes), the terminal device 200 selects the second coefficient table 400b (step S1205) and makes transition to the step S1011.

If two of the three scrambling codes are not the same (step S1204: No), i.e. if all of the scrambling codes are different, the terminal device 200 selects the third coefficient table 1100 (step S1206) and makes transition to the step S1011.

Furthermore, in calculation of the channel correlation value v in the step S1012, the gain factors β acquired in the step S1003, the amplitude ratios $\alpha_1$ and $\alpha_2$ of the DPCCH calculated in the step S1201, and the coefficient value data 701 acquired in the step S1011 are used.

As described above, the terminal device 200 according to embodiment 2 can achieve the same effects as those of embodiment 1. Furthermore, the terminal device 200 according to embodiment 2 performs a product-sum operation with use of the amplitude ratios $\alpha_1$ and $\alpha_2$ of the DPCCH about the carriers #2 and #3 employing the carrier #1 as the basis in addition to the correlation time average values that are calculated and stored in consideration of difference of the scrambling codes in advance and the gain factors β. This allows calculation of the time average value of an exponential of the transmission waveform according to the power allocation to the carriers #2 and #3 employing the carrier #1 as the basis. Therefore, the terminal device 200 can calculate, with a small amount of operation, the MPR value of the maximum transmission power in the case of simultaneously transmitting the respective signals generated by the respective carriers when the number of carriers is three or more.

Here, for example, there is a method in which $(v\_norm^3)_{rms}^2$ is calculated from a modulated transmission signal according to the standard as in the above-described Patent Document 1. In the case of calculating $(v\_norm^3)_{rms}^2$ by the method of Patent Document 1, the following expression (17), which is an expression made by modifying part of the CM calculation expression, is used.

$$20 \times \log 10(v\_norm^3)_{rms} = 10 \times \log 10(v\_norm^3)_{rms}^2 \quad (17)$$

In the method of calculating $(v\_norm^3)_{rms}^2$ from a baseband signal as in Patent Document 1, for example, to calculate a CM value with accuracy with an error range of ±0.1 dB, modulation processing and time averaging processing of about 100 symbols are executed and therefore the amount of operation is large. One symbol is composed of complex signals of 256 chips. Therefore, in the time averaging processing, operations of (four times of multiplication+one time of addition)×256 chips×100 symbols are performed to calculate the cubic value of the power value from IQ signals of the respective chips, and 256×100 times of addition are performed to perform averaging (addition) of 100 symbols. Moreover, a modulation processing operation of data is also performed.

Furthermore, in the method of the above-described Patent Document 2, a gain factor β as the amplitude ratio among the respective channels multiplexed into a transmission signal and a correlation value between the channels decided on the basis of modulation parameters other than the gain factor calculated in advance are used. In the method of Patent Document 2, $(v\_norm^3)_{rms}^2$ is calculated from the sum of values obtained by multiplying the gain factor and the correlation value between the channels about all combinations of the channels.

In the method of Patent Document 2, calculation of the MPR value in DC-HSUPA is not considered. In the DC-HSUPA, the magnitude of the correlation changes depending on difference in the power allocated among carriers. Furthermore, the value of the correlation changes depending on difference in the scrambling code between cells. Therefore, when the calculation method of the MPR value in SC-HSUPA is applied to the DC-HSUPA, an operation of the correlation time average value with consideration of the difference in the scrambling code between cells is performed each time, so that the amount of operation increases compared with calculation of the MPR value in the SC-HSUPA.

In contrast, the terminal device 200 of embodiments 1 and 2 can calculate the time average value of an exponential of the transmission waveform by using the correlation time average value calculated in advance without generating a transmission signal. Furthermore, the terminal device 200 can calculate the time average value of an exponential of the transmission waveform according to the scrambling codes of the respective carriers and the power allocation by a product-sum operation with use of the amplitude ratio α of the DPCCH of the respective carriers in addition to the correlation time average value obtained in consideration of difference of the scrambling codes and the gain factor β.

Therefore, the terminal device 200 can calculate, with a small amount of calculation, the MPR value of the maximum transmission power in the case of simultaneously transmitting the respective signals generated by the respective carriers in the plural carriers. For example, in the case of carrying out transmission of total seven channels by two carriers as in FIG. 3, the number of patterns of the combination about the correlation among channels is 84. The respective channel correlations can be calculated through total nine times of multiplication by the above expression (16). As calculation of the sum of these channel correlations, $(v\_norm^3)_{rms}^2$ can be calculated with the amount of operation of nine times of multiplication×84+one time of addition×(84−1).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication apparatus comprising:
   at least one antenna configured to transmit a transmission signal including a plurality of radio signals in parallel, each of the plurality of radio signals having each of a plurality of frequency bands, the plurality of radio signals including a plurality of physical channels, each of the plurality of radio signals including at least one of the plurality of physical channels;
   a memory configured to store a plurality of coefficient values, each of the plurality of coefficient values being associated with each of a plurality of first factors and each of a plurality of second factors, each of the plurality of first factors being each of a plurality of identities among each set of scrambling codes used in each set of specific physical channels among the plurality of physical channels, each of the plurality of second factors being each set of transmission formats used in each set of specific physical channels among the plurality of physical channels; and
   a processor configured to:
   obtain, for each repeated combination taken from the plurality of physical channels, each of coefficient values from the stored plurality of coefficient values, and estimate an exponential of amplitude of the transmission signal based on the obtained coefficient values;
   wherein the processor is further configured to estimate the exponential of amplitude of the transmission signal further based on a plurality of gain factors and a correction factor, each of the plurality of gain factors being a gain factor of each of the plurality of physical channels, the correction factor being a ratio of a pair of amplitudes of reference channels that are included in the plurality of radio signals respectively.

2. The wireless communication device according to claim 1, wherein
   the processor is configured to estimate the exponential of amplitude of the transmission signal by a product-sum operation based on the obtained coefficient values, the plurality of gain factors, and the correction factor.

3. The wireless communication device according to claim 1, wherein
   the plurality of coefficient values respectively indicate correlations among the plurality of physical channels.

4. The wireless communication device according to claim 1, wherein
   the processor is configured to estimate maximum power reduction (MPR) value of high speed uplink packet access (HSUPA) based on the estimated exponential of amplitude of the transmission signal.

5. The wireless communication device according to claim 1, wherein
   the processor is configured to set the amplitudes of reference channels based on a control information received from another wireless communication device.

6. The wireless communication device according to claim 1, wherein
   each of the transmission formats includes at least one modulation parameter that is independent from an amplitude of a corresponding physical channel.

7. The wireless communication device according to claim 1, wherein
   each of the transmission formats includes at least one of the number of codes, a spreading factor, a modulation scheme, and a channelization code.

8. The wireless communication device according to claim 1, wherein
   the memory configured to store a first table and a second table that include the plurality of coefficient values when the number of the plurality of radio signals is two, the first table being used when a same scrambling code is used in the two radio signals, the second table being used when two different scrambling codes are used in the two radio signals respectively.

9. The wireless communication device according to claim 1, wherein
   the memory configured to store a first table, a second table, and a third table that include the plurality of coefficient values when the number of the plurality of radio signals is three, the first table being used when a same scrambling code is used in the three radio signals, the second table being used when the same scrambling code is used in two of the three radio signals, the third table being used when three different scrambling codes are used in the three radio signals respectively.

10. A controlling method comprising:
    transmitting a transmission signal including a plurality of radio signals in parallel, each of the plurality of radio signals having each of a plurality of frequency bands, the plurality of radio signals including a plurality of physical channels, each of the plurality of radio signals including at least one of the plurality of physical channels;
    storing a plurality of coefficient values, each of the plurality of coefficient values being associated with each of a plurality of first factors and each of a plurality of second factors, each of the plurality of first factors being each of a plurality of identities among each set of scrambling codes used in each set of specific physical channels among the plurality of physical channels, each of the plurality of second factors being each set of transmission formats used in each set of specific physical channels among the plurality of physical channels;
    obtaining, for each repeated combination taken from the plurality of physical channels, each of coefficient values from the stored plurality of coefficient values; and
    estimating an exponential of amplitude of the transmission signal based on the obtained coefficient values;
    wherein estimating the exponential of amplitude of the transmission signal further based on a plurality of gain factors and a correction factor, each of the plurality of gain factors being a gain factor of each of the plurality of physical channels, the correction factor being a ratio of a pair of amplitudes of reference channels that are included in the plurality of radio signals respectively.

* * * * *